United States Patent
Chiussi et al.

(10) Patent No.: US 10,999,411 B2
(45) Date of Patent: *May 4, 2021

(54) USER INTERFACE AND CONTENT TRANSLATION SYSTEM

(71) Applicant: GADGET SOFTWARE, INC., Newark, NJ (US)

(72) Inventors: Fabio M. Chiussi, Long Branch, NJ (US); Parameshwar Hegde, Westford, MA (US)

(73) Assignee: GADGET SOFTWARE, INC., Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/916,702

(22) Filed: Jun. 30, 2020

(65) Prior Publication Data

US 2020/0329122 A1 Oct. 15, 2020

Related U.S. Application Data

(63) Continuation of application No. 16/119,295, filed on Aug. 31, 2018, now Pat. No. 10,757,222, which is a
(Continued)

(51) Int. Cl.
*H04L 29/08* (2006.01)
*H04W 4/50* (2018.01)

(52) U.S. Cl.
CPC .......... *H04L 67/36* (2013.01); *H04L 67/2823* (2013.01); *H04L 67/34* (2013.01); *H04L 67/303* (2013.01); *H04W 4/50* (2018.02)

(58) Field of Classification Search
CPC ..... H04L 67/36; H04L 67/2823; H04L 67/34; H04L 67/303; H04W 4/50
See application file for complete search history.

(56) References Cited

U.S. PATENT DOCUMENTS 6,542,908 B1 4/2003 Ims
6,804,718 B1 10/2004 Pang et al.
(Continued)

OTHER PUBLICATIONS

ISR written opinion of the International searching authority for the corresponding PCT application.
(Continued)

*Primary Examiner* — Andrey Belousov
(74) *Attorney, Agent, or Firm* — Miles & Stockbridge P.C.; David R Schaffer

(57) ABSTRACT

A system solution offers a Business Entity an automatically generated set of User Interfaces to run on a plurality of Client Devices of different characteristics in terms of operating system, hardware, and look and feel, and yet provide the same user experience. A User Interface that offers a user experience on a Reference Client Device is automatically translated to offer the same user experience on a plurality of Client Device having different characteristics from the Reference Client Device. The objects displayed in the User Interface for the Reference Client Device are placed on a Translation Grid that is generated and superimposed on the User Interface. A Client Translator and Generator translates the User Interface from the Reference Client to the plurality of Client Devices using the Translation Grid and a set of Translation Rules. A measurement of the automatic translation process identifies optimal and sub-optimal translation for each Client Device.

20 Claims, 20 Drawing Sheets

Related U.S. Application Data continuation of application No. 13/833,849, filed on Mar. 15, 2013, now Pat. No. 10,075,560.

(56) References Cited

U.S. PATENT DOCUMENTS

| | | |
|---|---|---|
| 7,461,086 B1 | 12/2008 | Hurren et al. |
| 7,596,620 B1 | 9/2009 | Colton et al. |
| 7,676,552 B2 | 3/2010 | Eilam et al. |
| 7,822,983 B2 | 10/2010 | Aull et al. |
| 7,984,060 B2 | 7/2011 | Payton et al. |
| 8,170,536 B2 | 5/2012 | Normark et al. |
| 8,407,610 B2 | 3/2013 | Gilboa et al. |
| 9,430,207 B1 | 8/2016 | Bandhole et al. |
| 9,959,103 B2 | 5/2018 | Van Velzen et al. |
| 10,051,444 B2 | 8/2018 | Chiussi et al. |
| 10,320,885 B2 | 6/2019 | Chiussi et al. |
| 10,320,942 B2 | 6/2019 | Chiussi et al. |
| 10,326,825 B2 | 6/2019 | Chiussi et al. |
| 10,728,717 B2 | 7/2020 | Chiussi et al. |
| 2002/0033843 A1 | 3/2002 | Loos et al. |
| 2002/0078253 A1 | 6/2002 | Szondy et al. |
| 2003/0028579 A1 | 2/2003 | Kulkarni et al. |
| 2003/0208640 A1 | 11/2003 | Just |
| 2006/0026335 A1 | 2/2006 | Hodgson et al. |
| 2006/0236254 A1 | 10/2006 | Mateescu et al. |
| 2006/0236302 A1 | 10/2006 | Bateman et al. |
| 2007/0150816 A1 | 6/2007 | Hariki |
| 2007/0157191 A1 | 7/2007 | Seeger et al. |
| 2009/0006409 A1 | 1/2009 | Yang et al. |
| 2009/0063421 A1 | 3/2009 | Burson et al. |
| 2009/0183092 A1 | 7/2009 | Naghshineh |
| 2010/0005481 A1 | 1/2010 | Lewis et al. |
| 2010/0070496 A1 | 3/2010 | Ghosh |
| 2010/0124939 A1 | 5/2010 | Osborne et al. |
| 2011/0004564 A1 | 1/2011 | Rolia et al. |
| 2011/0016448 A1 | 1/2011 | Bauder et al. |
| 2011/0137935 A1 | 6/2011 | Bobick et al. |
| 2011/0154287 A1 | 6/2011 | Mukkamala et al. |
| 2011/0161912 A1 | 6/2011 | Eteminan et al. |
| 2011/0164056 A1 | 7/2011 | Ording et al. |
| 2011/0276608 A1 | 11/2011 | O'Farrell et al. |
| 2012/0094643 A1 | 4/2012 | Brisebois et al. |
| 2012/0109951 A1 | 5/2012 | Huynh et al. |
| 2012/0174079 A1 | 7/2012 | Luh |
| 2012/0213103 A1 | 8/2012 | Cheng-Wei et al. |
| 2012/0226676 A1 | 9/2012 | Kasterstein et al. |
| 2012/0260232 A1 | 10/2012 | Hirsch et al. |
| 2012/0278704 A1 | 11/2012 | Ying et al. |
| 2012/0322470 A1 | 12/2012 | Said et al. |
| 2012/0323965 A1 | 12/2012 | Carpenter et al. |
| 2013/0013671 A1 | 1/2013 | Relan et al. |
| 2013/0219376 A1 | 8/2013 | Nelson |
| 2014/0033011 A1 | 1/2014 | Wandeler et al. |
| 2014/0068549 A1 | 3/2014 | Friedman et al. |
| 2014/0089339 A1 | 3/2014 | Siddiqui et al. |
| 2014/0245262 A1 | 8/2014 | Hill et al. |
| 2014/0280475 A1 | 9/2014 | Chiussi et al. |
| 2015/0304389 A1 | 10/2015 | Chiussi et al. |
| 2020/0007615 A1 | 1/2020 | Brebner |

OTHER PUBLICATIONS

First Examination Report issued by the Patent Office of India in corresponding Indian Application No. 3457/KOLNP/2015 dated May 26, 2020.
First Examination Report issued by the Patent Office of India in corresponding Indian Application No. 3455/KOLNP/2015 dated Jun. 9, 2020.
Any information that are not included with this Information Disclosure Statement can be found in U.S. Appl. No. 16/119, 295 and U.S. Appl. No. 13/833,849.
Non-Final Office Action dated Oct. 15, 2020 in corresponding U.S. Appl. No. 16/398,929.
Notice of Allowance dated Oct. 23, 2020 in corresponding U.S. Appl. No. 16/398,932.
Non-Final Office Action dated Dec. 4, 2020 in corresponding U.S. Appl. No. 16/398,925.
Non-Final Office Action dated Mar. 9, 2021 for corresponding U.S. Appl. No. 16/398,929.

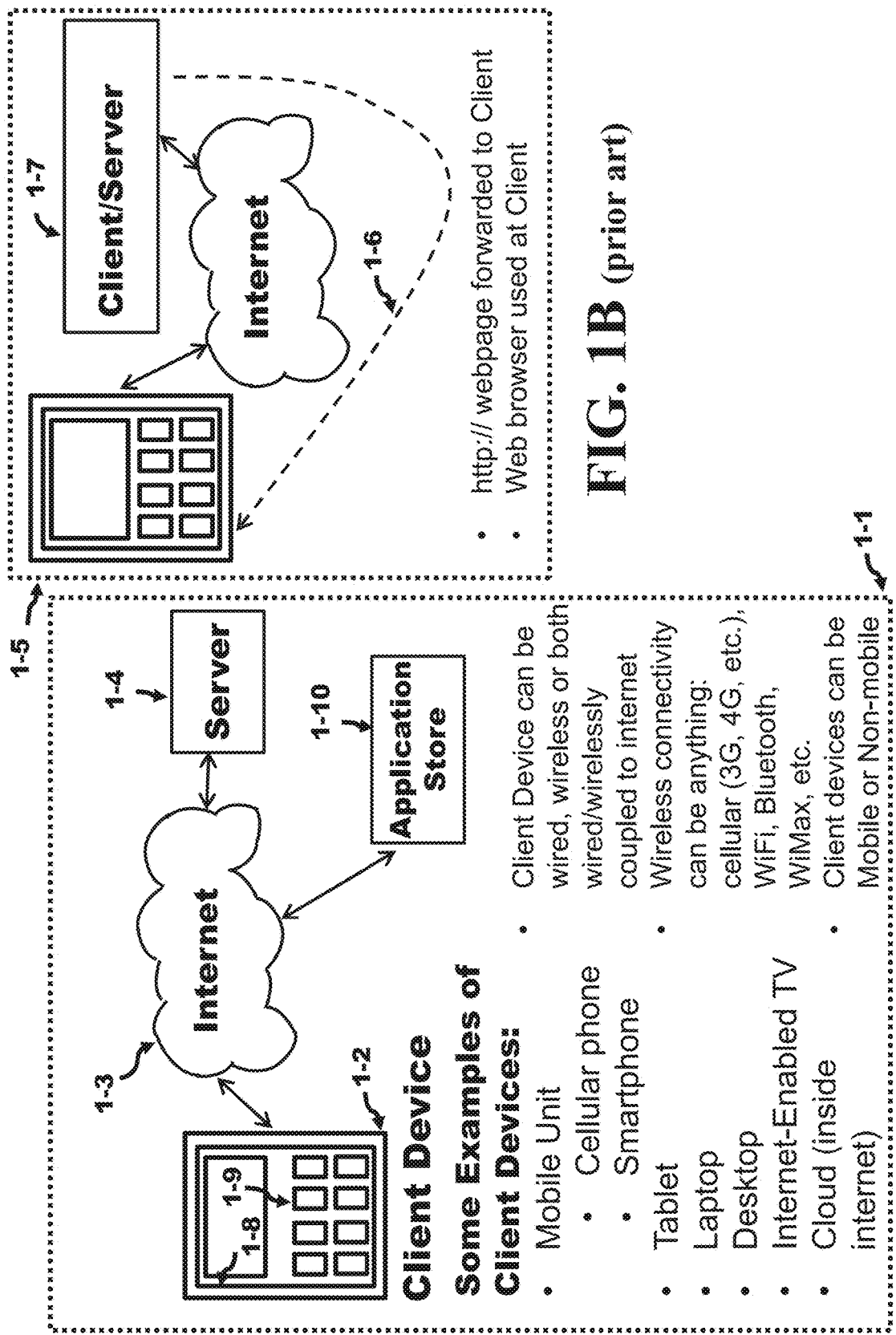

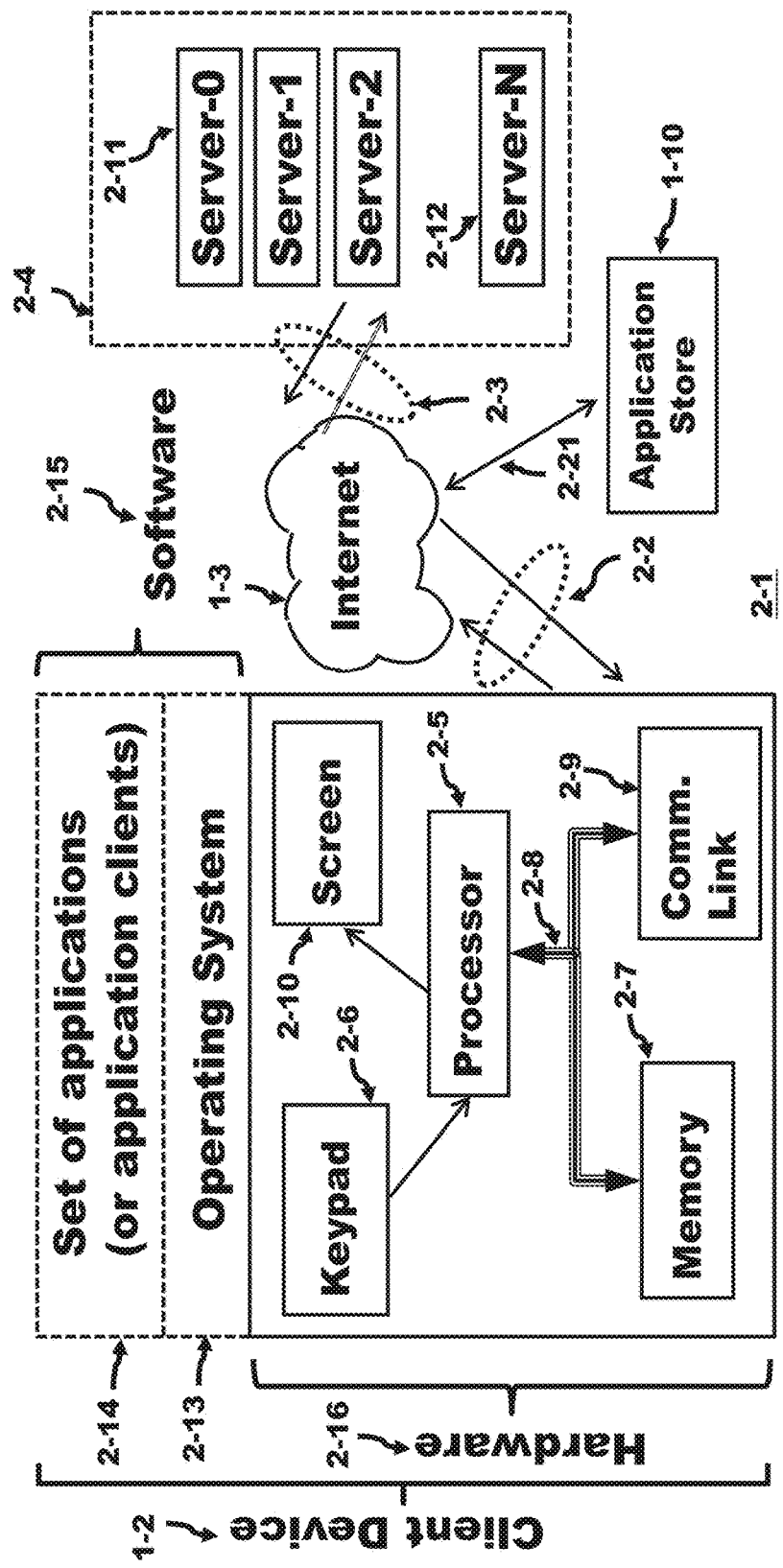
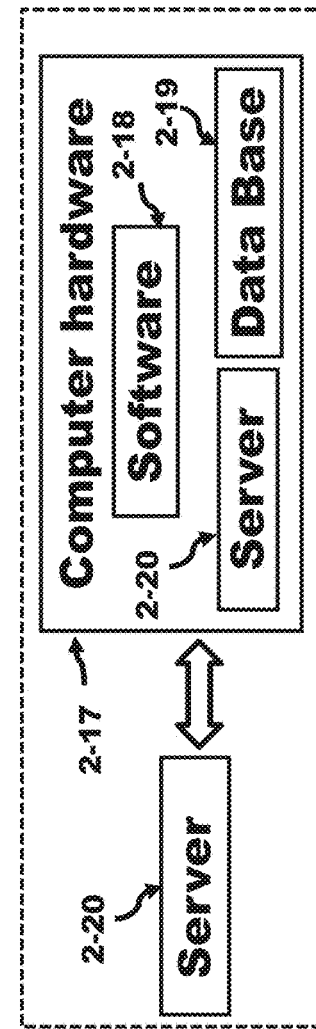
FIG. 2A (prior art)
FIG. 2B (prior art)

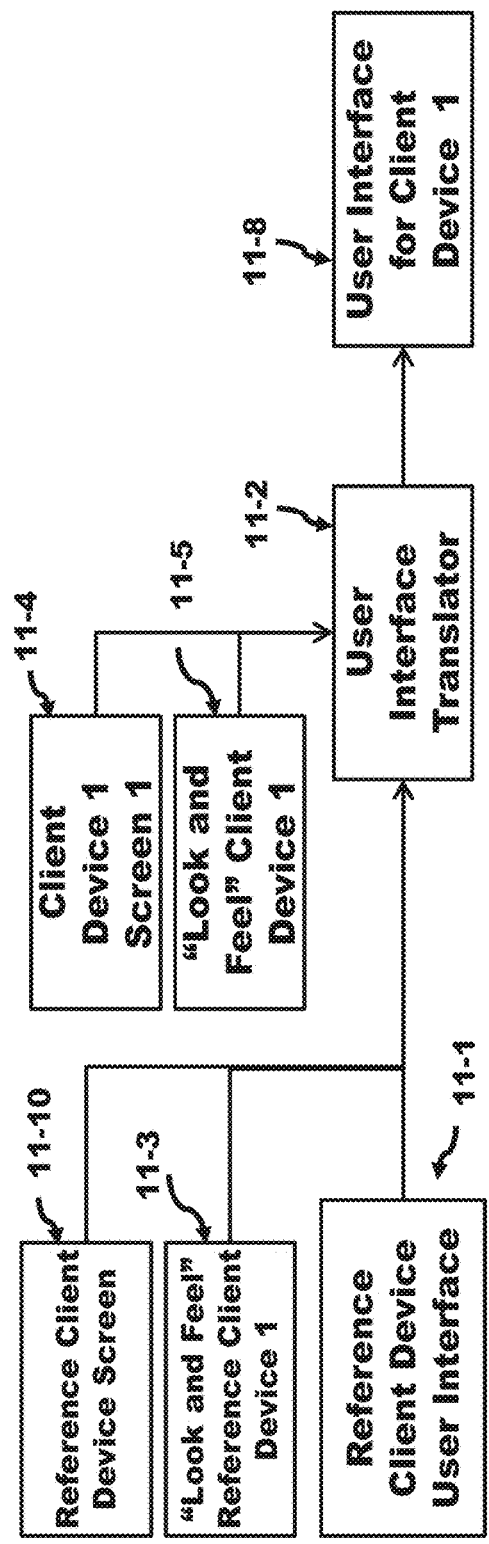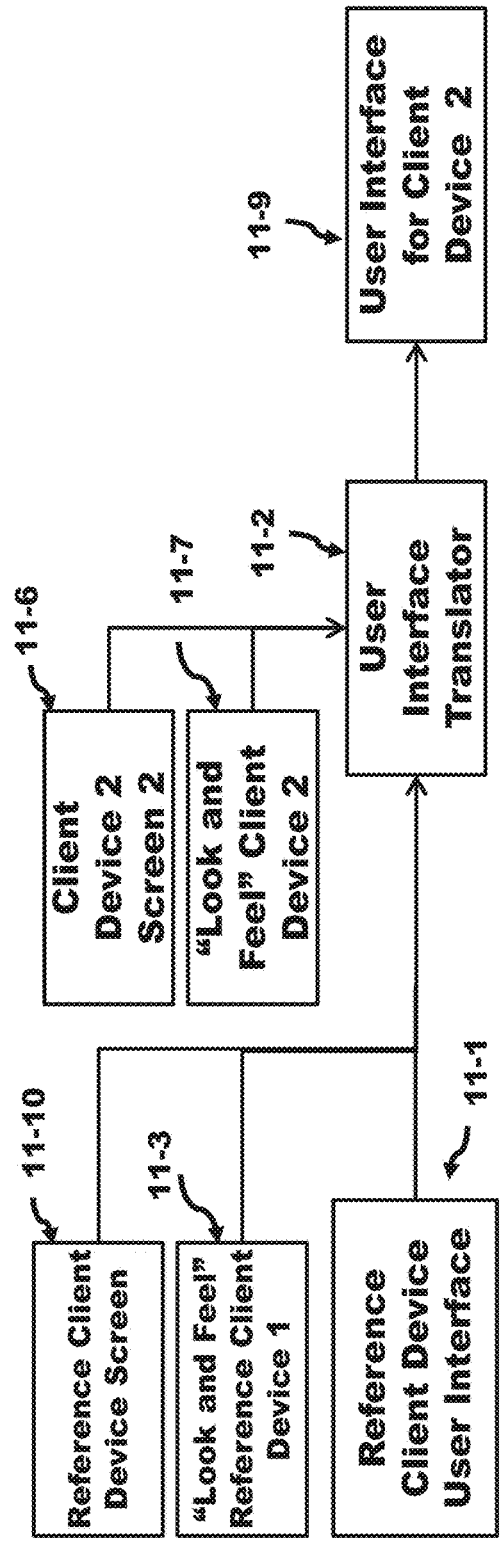
FIG. 11A
FIG. 11B

USER INTERFACE AND CONTENT TRANSLATION SYSTEM

PRIORITY APPLICATION

This application is a continuation of U.S. patent application Ser. No. 16/119,295, filed on Aug. 31, 2018, which is a continuation of U.S. patent application Ser. No. 13/833,849, filed on Mar. 15, 2013, which issued as U.S. Pat. No. 10,075,560 on Sep. 11, 2018, the contents of which are herein incorporated by reference in their entirety.

CROSS-REFERENCE TO RELATED APPLICATIONS

The present application is related to the co-filed U.S. application Ser. No. 13/833,589 entitled "Apparatus for Single Workflow for Multi-Platform Mobile Application Creation and Delivery", Ser. No. 13/833,669 entitled "Method for Single Workflow for Multi-Platform Mobile Application Creation and Delivery", Ser. No. 13/833,775 entitled "Dynamic User Interface Delivery System", and Ser. No. 13/834,765 entitled "Hierarchical Application Client System", which are assigned to the same assignee as the present application and invented by the same inventors as the present application and incorporated herein by reference in their entireties.

BACKGROUND OF THE INVENTION

The internet is a communication system that interconnects the world. The internet has been structured to provide connectivity to billions of users with laptops, notebooks, desktops, Internet Enabled TV sets, cellular phones, smartphones like the iPhone™, Android™ and Blackberry™ wearable devices, and tablets. The internet 1-3 connects a Client Device 1-2 to a server 1-4 and the server to the same Client Device as illustrated in 1-1 of FIG. 1A or to another Client Device (not illustrated). The Client Device 1-2 can have at least one display screen 1-8 that can be a touch sensitive screen, pen based or both. The screen can display various icons or be attached to a physical keypad 1-9. As illustrated in 1-1, the Client Devices are physical and can be either mobile, such as cellular phones, smartphones, wearable devices, and tablets, or non-mobile, such as laptops, desktops, and TV sets, The Client Devices 1-2 are coupled to the internet by wired (a physical interconnect), wirelessly (waves through space), or both wired/wireless networks. The wireless connectivity can be cellular (3G, 4G, etc.), Wi-Fi, Bluetooth, WiMax, etc. The Client Device 1-2 runs the Application Client which is the actual application software running on device.

FIG. 1A also shows an application store connected to the Internet. The application store makes application clients available for download to the Client Devices. There is a plurality of application stores, each of the application stores dedicated to make available for download Application Clients for a certain type of Client Device or Client Device operating system. For example, the Apple™ application store makes Application Clients for the iPhone™ and iPad™ available for download, the Android™ application store makes Application Clients for smartphones and tablets running the Android™ operating system available for download, etc. There are application stores dedicated to support mobile Client Devices (for example, the iPhone™/iPad™ Apple™ application store, the Blackberry™ application store, etc.), and application stores dedicated to support non-mobile Client Devices (for example, the Mac™ Apple™ application store, which makes applications for Apple™ computers running the Mac™ operating system available for download).

The Cloud uses the network of the internet to offer services to users by using a combination of hardware and software embedded in the network. An Application Client can be in the Cloud, but in this case the Client Device is a "virtual" Client Device. The "virtual" Client Device has a way to provide access to the Application Client running in the cloud via a physical Client Device. For example, as in the example listed in 1-5 of FIG. 1B, a web browser 1-6 running on the physical Client Device 1-2 and coupled to the client/server 1-7 in the Cloud via the Internet accesses the Application Client running in the Cloud, which performs the actual application software. For the Cloud, there are two cases: the entire Application Client runs in the Cloud, or a small portion of the Application Client runs on a physical Client Device while most of the logic runs in the Cloud.

FIG. 2A illustrates a system 2-1 with the hardware 2-16 and software 2-15 of a Client Device 1-2. The Client Device 1-2 is coupled to the internet 1-3 via wireline connection or Radio Frequency (RF) wireless transmission network (wired/wireless) 2-2 and further coupled to a bank of servers 2-4 via a second interconnection 2-3 that can be wired or wireless. The communication link is a receiver and a transmitter known as a transceiver and is coupled to either a wired connector or an antenna (not illustrated) for the wireline connection or RF wireless transmission network, respectively. In general, these links: wired, wireless, cellular, internet, etc. are called the Communication network. The Communication network couples all components together. The server's bank 2-4 comprises server-0 2-11 to server-N 2-12. The bank contains at least one server and these servers can be localized, coupled by an Intranet, or be physically separated from one another, coupled by the Internet. The operating system (OS) 2-13 running in the Client Device is closely coupled with the hardware 2-16, especially in case of Mobile Client Devices 1-2. The hardware 2-16 comprises at least one processor 2-5 operating under the operating system 2-13. The processor 2-5 is coupled to at least one memory 2-7 and at least one communication link 2-9 via at least one bus 2-8. At least one communication link 2-9 couples the Client Device to the outside world through a wired and/or wireless interconnection via the transceiver. The Client Device offers the user at least one mode of input and one mode of output. One mode of input to the Client Device 1-2 is via the touch based keypad 2-6 or through voice control (not illustrated). The screen 2-10 can be a touch sensitive screen and provide a second mode of input. The screen 2-10 can provide an output response or sound can provide a second mode of output known as voice output (not illustrated). Other hardware components such as MEMS, power supplies, etc. are not mentioned but as well-known by those skilled in the art. A set of applications or Application Clients 2-14 run on the Client Device are coupled to the operating system 2-13. The Client Device is one of a plurality of Client Devices coupled to the Internet. An Application Store 1-10 connected 2-21 to the Internet.

FIG. 2B illustrates that when the term server 2-20 is used, this server is a sub-set representation of a Computer hardware 2-17, which can contain software 2-18, a database 2-19 and the server 2-20 itself. Other components not illustrated are the memory, power supply, etc. One skilled in the art is knowledgeable of other components contained in this device and will not be described further. All servers used in this specification are substantially the same as the server 2-20.

Furthermore, a plurality of servers and a plurality of databases can be embedded in the Computer hardware 2-17.

The term "Client Device" encompasses the device being mobile, non-mobile, or located in the Cloud. However, in some cases, for further distinction within this document the term "Mobile Client Device" will be used for mobile devices, "Non-Mobile Client Device" will be used for non-mobile devices and "Cloud Client Device" will be used for the device formed in the Cloud.

FIG. 3A and FIG. 3B present two different types of Application Clients. This distinction is especially relevant in the case of mobile Client Devices, but is also applicable to non-mobile Client Devices. FIG. 3A shows a Native Application Client 3-1 and how it relates to the layered stacks of the hardware/software representation of a Client Device 1-2. The Native Application Client 3-1 includes a User Interface 3-5 and a Client Functionality 3-2. The User Interface 3-5 provides at least one mode of input and one mode of output to the end user and is the means with which the end user interacts with the Native Application Client 3-1. The Native Application Client 3-1 is an executable which runs directly on the operating system 2-13 of the Client Device 1-2, which in turn runs on the hardware 2-16 of the Client Device. The operating system 2-13 provides a set of system libraries 3-3, which the Native Application Client uses. The Native Application Client is compiled to run on the operating system of the Client Device. The Native Application Client needs to be downloaded to the Client Device and installed on the Client Device in order to run on the Client Device. The User Interface 3-5 depends on the operating system 2-13 and on the hardware 2-16, and in particular on the screen 2-10.

FIG. 3B shows a Non-Native Application Client and how it relates to the layered stacks of the hardware/software representation of a Client Device. The Non-Native Application Client 3-1*h* includes a User Interface 3-5*h* and a Client Functionality 3-2*h*. The User Interface 3-5*h* provides at least one mode of input and one mode of output to the end user and is the means with which the end user interacts with the Non-Native Application Client 3-1*h*. The Non-Native Application Client 3-1*h* does not run directly on the operating system 2-13*h* of the Client Device, but instead uses a web browser 3-5 installed on the Client Device in order to run. The Non-Native Application Client 3-1*h* is written in a programming language that is understood by the web browser running on the Client Device. The most common example of such a language is HTML5. The web browser running on the Client Device contains a parser 3-4 that is used to interpret the code of the Non-Native Application Client 3-1*h*. The Non-Native Application Client 3-1*h* does not depend on the Client Device 1-2*a* since it does not run directly on the operating system 2-13*h* but instead uses the web browser 3-3 running on the Client Device 1-2*a*. The Non-Native Application Client 3-1*h* can run on any Client Device 1-2*a* that runs a web browser 3-5 capable of understanding the language which the Non-Native Application Client is written in. The web browser 3-5 may depend on the Client Device 1-2*a*, but the Non-Native Application client does not depend on the Client Device. The User Interface 3-5*h* depends on the operating system 2-13*h* and on the hardware 2-16*h*, and in particular on the screen 2-10*h*.

The term "Application Client" refers to the portion of the application running on the Client Device. The term "Application Client" encompasses the Application Client running on a mobile Client Device, a non-mobile Client Device or even in the Cloud. The Cloud can run a portion of the Application Client in the server while the remaining portion of the Application Client can run on the Client Device, simultaneously. The term "Application Client" is used to refer to both Native and Non-Native Application Client. The term "Mobile Application Client" will be used for both Native and Non-Native Application Clients running on a mobile Client Device, but it also applies to Client Devices that are non-mobile or in the Cloud.

An approval and download process in the Application Store is illustrated in FIG. 4. A Business Entity 4-1 creates a new application which comprises a new Native Application Client 3-1. The new Native Application Client 3-1 is submitted 4-3 to the Application Store 1-10 for an approval process 4-4. Once the new Native Application Client is accepted 4-5, information is passed to the Application Store 1-10 to make the new Native Application Client available for download and install 4-6 into a Client Device 1-2. A Client Device 1-2 which desires the Native Application Client 3-1 downloads the Native Application Client from the corresponding application store 1-10. For example, an iPhone™ downloads its desired Native Application Client from the Apple™ application store, an Android™ device downloads its desired Native Application Client from the Android™ application store, etc. Once the Native Application Client is downloaded to the Client Device, it is installed on the Client Device so it can run on the operating system of the Client Device. The client now contains a "native" application coupled to the operating system 2-13 (see FIG. 2A) of the Client Device. The Native Mobile Application Client executable depends on the operating system (OS) as an iPhone would require a different executable than an Android™ phone.

BRIEF SUMMARY OF THE INVENTION

It is a first objective of the invention to provide a system solution that offers the Business Entity a way to automatically generate a set of User Interfaces to run on a plurality of Client Devices of different types in terms of operating system, hardware, and look and feel. A first User Interface in the set of generated User Interfaces is adapted to the characteristics of a first Client Device in the plurality of Client Devices. The first generated User Interface offers the end user on the first Client Device the same user experience as the user experience that a second generated User Interface in the set of generated User Interface, which is adapted to the characteristics of a second Client Device in the plurality of Client Devices, offers the end user on the second Client Device. Using these inventive ideas, the Business Entity automatically generates a plurality of User Interfaces that offer the same user experience in a plurality of Client Devices of different characteristics in terms of operating system, hardware, and look and feel.

It is a second objective of the invention to provide a way to quantify that a first User Interface offers the same user experience on a first Client Device as a second User Interface offers on a second Client Device of different characteristics in terms of operating system, hardware, and look and feel.

A preferred embodiment of the invention is a method to automatically translate a User Interface designed to offer a user experience on a Reference Client Device into a User Interface designed to offer the same user experience on a first Client Device the first Client Device having different characteristics from the Reference Client Device in terms of operating system, hardware, and look and feel.

In this preferred embodiment of the invention, the objects displayed in the User Interface for the Reference Client Device are classified as Content Objects, Shape Objects, and Navigation Object. A Reference Translation Grid is generated and superimposed on the User Interface of the Reference Client Device. The objects displayed in the User Interface for the Reference Client Device are placed in relation to the Reference Translation Grid. Reference Text Formatting Translation Rules, Reference Object Formatting Translation Rules, Reference Top Navigation Translation Rules, Reference Bottom Navigation Translation Rules, and Reference Look and Feel Translation Rules are defined. Corresponding Client Translation Grid, Client Text Formatting Translation Rules, Client Object Formatting Translation Rules, Client Top Navigation Translation Rules, Client Bottom Navigation Translation Rules, and Client Look and Feel Translation Rules are defined for each Client Device in the plurality of Client Devices of different characteristics in terms of operating system, hardware, and look and feel.

In this preferred embodiment of the invention, a User Interface for a first Client Device in the plurality of different characteristics in terms of operating system, hardware, and look and feel is generated by scaling the objects according to the relative screen sizes and resolution of the Reference Client Device and first Client Device, placing the objects on the Client Translation Grid in the grid position corresponding to the object placed in the Reference Translation Grid, and applying the Client Text Formatting Translation Rules, Client Object Formatting Translation Rules, Client Top Navigation Translation Rules, Client Bottom Navigation Translation Rules, and Client Look and Feel Translation Rules.

Another preferred embodiment of the invention includes computing a Reference Fill Score for the User Interface for the Reference Client Device, a Client Fill Score for the generated User Interface for the first Client Device, and a Translation Ratio. The Translation Ratio is compared with a Translation Threshold to determine that the generated User Interface for the first Client Device offers the end user on the first Client Device the same user experience that the User Interface for the Reference Client Device offers the end user on the Reference Client Device.

Another preferred embodiment of the invention includes a method to adjust the generated User Interface for the first Client Device if, by comparing the computed Translation Ratio with a Translation Threshold, it is determined that the generated User Interface for the first Client Device does not offer the end user on the first Client Device the same user experience that the User Interface for the Reference Client Device offers the end user on the Reference Client Device. The adjustment of the generated User Interface for the first Client Device makes the user experience offered to the end user on the first Client Device more similar to the user experience offered to the end user on the Reference Client Device.

This preferred embodiment of the invention includes a method to determine that a generated User Interface for the first Client Device, which does not offer the end user on the first Client Device the same user experience that the User Interface for the Reference Client Device offers the end user on the Reference Client Device, cannot be further automatically adjusted in order to make the user experience offered to the end user on the first Client Device more similar to the user experience offered to the end user on the Reference Client Device.

Another preferred embodiment of the preferred invention includes the apparatus comprising Computing devices with dedicated servers running the System Solution that takes as input a User Interface designed for a Reference Client Device and automatically generates a plurality of User Interfaces designed to run on a plurality of Client Devices of different types in terms of their operating system, hardware, and look and feel characteristics.

In another preferred embodiment of the invention, the System Solution includes the apparatus comprising Computing devices with dedicated servers which determine whether a generated User Interface for a first Client Device offers the end user the same user experience of a User Interface for a Reference Client Device of different characteristics. If the a generated User Interface for a first Client Device does not offer the end user the same user experience as a User Interface for a Reference Client Device, the apparatus identifies which portions of the User Interface for the first Client Device do not offer the end user the same user experience as a User Interface for a Reference Client Device.

In accordance with another preferred embodiment of the invention, a System Apparatus comprising a Reference Client Device with a Reference Application Client with an first Operating system and a first screen of a first aspect ratio and a first screen resolution, a plurality of Objects displayed on a User Interface of the Reference Client Device, a Client Translator and Generator receives the User Interface of the Reference Application Client and automatically generates and translates a plurality of User Interfaces of Application Clients other than the Reference Application Client for a plurality of Client Devices, each Application Client with one of a plurality of Operating Systems and a corresponding one of a plurality of different screens with a different aspect ratio and a different screen resolution, and the plurality of the User Interfaces of the Application Client display the plurality of Objects on the plurality of different screens. The System Apparatus further comprising an Automatic Application Client Generator receives data from a Client Data Model and generates a Reference Application Client including the User Interface of the Reference Client Device. The System Apparatus further comprising a set of Native Mobile Application Clients, a set of Native Nom-Mobile Application Clients, Non-Native Non-Mobile Application Clients, Non-Native Non-Mobile Cloud Application Clients, and Non-Native Mobile Application Clients in the plurality of Application Clients. The System Apparatus further comprising a User Interface Translator in the Client Translator and Generator that combines the User Interface of the Reference Client Device with the plurality of Client Devices to generate a plurality of User Interfaces that feature the plurality of Objects of the Reference Client Device for each of the plurality of Client Devices. The System Apparatus further comprising the Reference Client Device providing a reference parameters to translate the reference parameters into the parameters used in the plurality of Client devices. The System Apparatus further comprising the User Interface of the Reference Application Client with a plurality of pages. The System Apparatus further comprising a page with a Body Area with a Top Navigation Area and/or a Bottom Navigation Area displaying the plurality of Objects, the System Apparatus further comprising a Translation Grid that partitions the Body Area on the Reference Client Device and each Client Device in the plurality of Client Devices into Translation Grid Nodes, Translation Grid Height and, Translation Grid width parameters, and a set of translation rules for the Reference Client Device and each Client Device in the plurality of Client Devices, and the System Apparatus wherein the translation grid is used to place the plurality of Objects on the Body Area of each Client Device in the plurality of Client Device. The System Apparatus further comprising a Content Object Picture with a Picture Format, Content Object Video with a Video Format, a Context Object Text with a Text Format, a Shape Object with a Shape format, and a Navigation Object with a Navigation Object Format forming the plurality of Objects.

In accordance with another preferred embodiment of the invention, a method of automatically generating an optimal translation comprising the steps of selecting each Client Device in a plurality of Client Devices, each Client Device with one of a plurality of Operating Systems and a corresponding one of a plurality of different screens each with a different aspect ratio and a different screen resolution, providing a Page with a Body Area, adjusting a Translation Grid to the Body Area of a selected Client Device, converting sizes and a resolution of each of a plurality of Objects, placing the plurality of Objects on the Translation Grid of the selected Client Device filling up a portion of the Translation Grid, computing a Fill Score of the selected Client Device of the filled portion of the Translation Grid area, computing a Translation Ratio as the ratio of the Fill Score of the selected Client Device and the Fill Score of a Reference Client Device, comparing if the computed Translation Ratio is less than or equal to a Translation Threshold, and generating the optimal translation automatically of a User Interface of the Reference Client Device into a plurality of User Interfaces of each Client Device in the plurality of Client Devices. The method further comprising the steps of placing the Top Navigation Area and/or Bottom Navigation Area at the Top and/or Bottom of the Body Area and in addition the method further comprising the steps of checking if the Top and/or Bottom Navigation Rules are valid. The method further comprising the steps of identifying the plurality of Objects from a list comprising Content Object Picture with a Picture Format Translation Rules, Content Object Video with a Video Format Translation Rules, a Context Object Text with a Text Format Translation Rules, a Shape Object with a Shape Format Translation Rules, and a Navigation Object with a Navigation Object Format Translation Rules. The method wherein a Translation Grid that partitions the Body Area into Translation Grid Nodes, Translation Grid Height and, Translation Grid width parameters and the translation grid is used to place the plurality of Objects on the Body Area of a plurality of different screens, simultaneously.

In accordance with another preferred embodiment of the invention, a method of identifying when a translation is suboptimal comprising the steps of selecting each Client Device in a plurality of Client Devices, each Client Device with one of a plurality of Operating Systems and a corresponding one of a plurality of different screens each with a different aspect ratio and a different screen resolution, providing a Page with a Body Area, adjusting a Translation Grid to the Body Area of a selected Client Device, converting sizes and a resolution of each of a plurality of Objects, (a) placing the plurality of Objects on the Translation Grid of the selected Client Device filling up a portion of the Translation Grid, (b) computing a Fill Score of the selected Client Device of the filled portion of the Translation Grid area, (c) computing a Translation Ratio as the ratio of the Fill Score of the selected Client Device and the Fill Score of a Reference Client Device, (d) comparing if the computed Translation Ratio is less than or equal to a Translation Threshold and identifying that the translation is optimal, and generating the optimal translation automatically of a User Interface of the Reference Client Device into a plurality of User Interfaces of each Client Device in the plurality of Client Devices, otherwise, (e) determining if a maximum number of iterations have been reached then the translation is suboptimal and identify the suboptimal translation to a System Solution Expert, otherwise, applying Text Formatting Translation Rules to a Context Object Text from the plurality of Objects, applying Object Formatting Translation Rules to the remaining plurality of Objects, computing new Object Sizes, and repeating steps (a)-(e). The method further comprising the steps of placing the Top Navigation Area and/or Bottom Navigation Area at the Top and/or Bottom of the Body Area, and in addition the method further comprising the steps of checking if the Top and/or Bottom Navigation Rules are valid. The method further comprising the steps of identifying the remaining plurality of Objects from a list comprising Content Object Picture with a Picture Format Translation Rules, Content Object Video with a Video Format Translation Rules, a Shape Object with a Shape Format Translation Rules, and a Navigation Object with a Navigation Object Format Translation Rules. The method wherein a Translation Grid that partitions the Body Area into Translation Grid Nodes, Translation Grid Height and, Translation Grid width parameters and the translation grid is used to place the plurality of Objects on the Body Area of a plurality of different screens, simultaneously.

BRIEF DESCRIPTION OF THE DRAWINGS

Please note that the drawings shown in this specification may not necessarily be drawn to scale and the relative dimensions of various elements in the diagrams are depicted schematically. The inventions presented here can be embodied in many different forms and should not be construed as limited to the embodiments set forth herein. Rather, these embodiments are provided so that this disclosure will be thorough and complete, and will fully convey the scope of the invention to those skilled in the art. In other instances, well-known structures and functions have not been shown or described in detail to avoid unnecessarily obscuring the description of the embodiment of the invention. Like numbers refer to like elements in the diagrams.

FIG. 1A depicts a Client Device coupled to a server and an Application Store and provides some examples of Client Devices.

FIG. 1B depicts a Client Device coupled to a client/server.

FIG. 2A shows a Client Device with a coupling to a bank of servers, an Application Store, and the internal hardware/software structure of the Client Device.

FIG. 2B depicts a more detailed description of a server being a subset of Computer hardware with software, a Database and the server.

FIG. 11A shows the User Interface Translation Process on a first Device in accordance with the present invention.

FIG. 11B illustrates the User Interface Translation Process on a second Device in accordance with the present invention.

DETAILED DESCRIPTION OF THE INVENTION

Figures 3A, 3B:
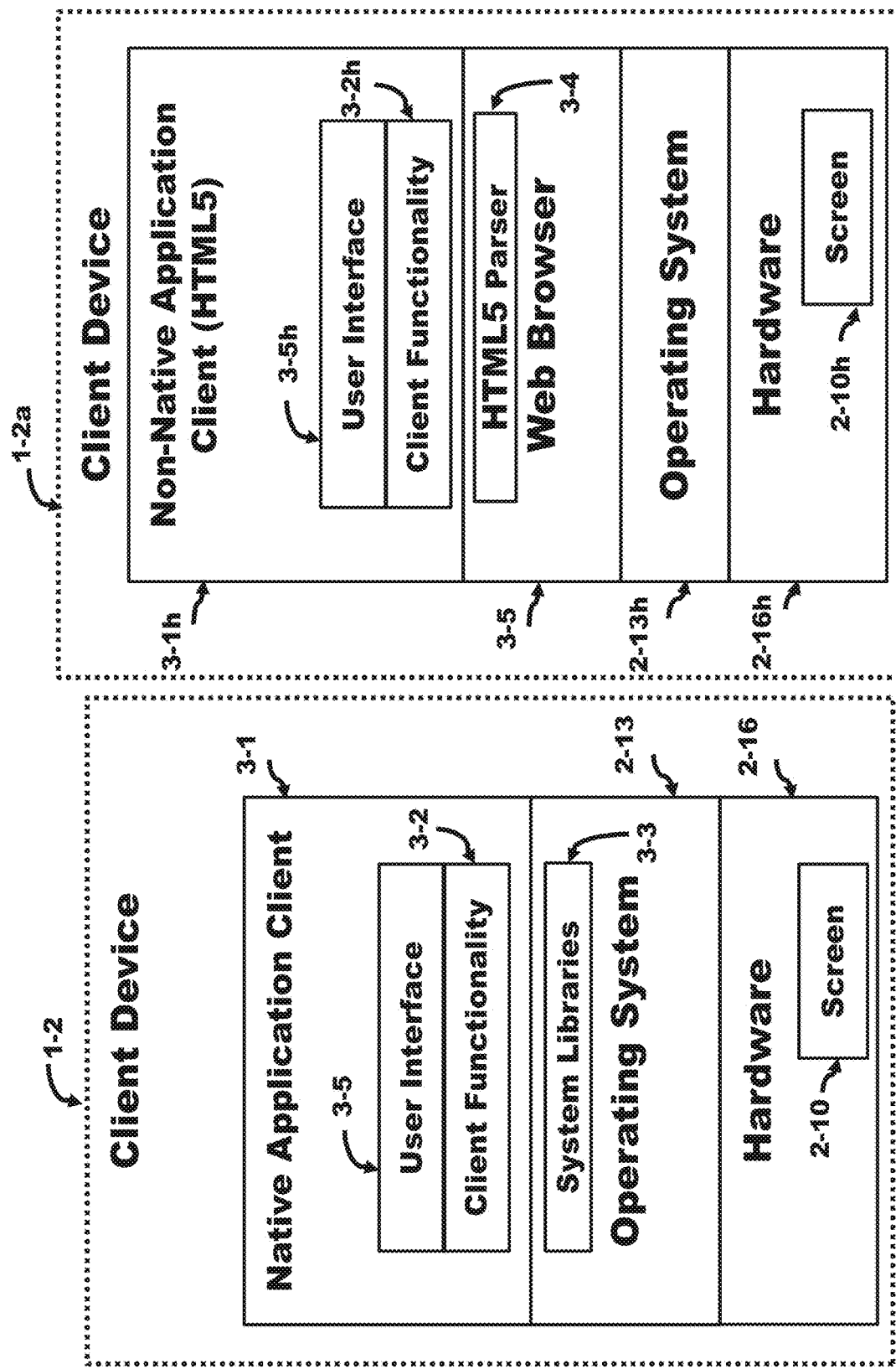
FIG. 3A presents a Native Application Client and how it relates to the layered stacks of the hardware/software representation of a Client Device.
FIG. 3B illustrates a Non-Native Application Client and how it relates to the layered stacks of the hardware/software representation of a Client Device.

The System Solution offers the ownership, control and beneficial use of this inventive idea. The System solution offers the beneficial use to the Business Entity by providing the Business Entity with Application Clients adapted to the characteristics of all the Client Devices which the Business Entity desires the Application Client to run on. The Application Clients provided by the System Solution comprise a plurality of Native Application Clients that run on Mobile, Non-Mobile, and Cloud Client Devices of different types and a plurality of Non-Native Application Clients that run on Mobile, Non-Mobile, and Cloud Client Devices of different types.

The System Solution is the owner of all Application Components, including Native and Non-Native Application Client, automatically generated by the System Solution. The System Solution creates and hosts Applications and generates Application Clients for different Business Entities (each Business Entity is a System Solution customer). The System Solution provides a complete environment for the creation, hosting, updating, and management of the Application. The Application Servers generated by the System Solution for all Business Entities are hosted in a multi-tenant environment in the Cloud, but each Business Entity "feels" like it is provided a dedicated Application Server. The System Solution architecture also applies with minor changes to a scenario where the System Solution Application Server run on dedicated servers owned by the Business Entity, rather than in the Cloud. In this scenario, the System Solution has access to control and offer beneficial use for those servers that are coupled to the Cloud.

Business Entities deploy their Applications and Application Clients to reach Consumers (i.e., the customers of that Business Entity served by System Solution). The Consumers are the primary End Users of the Application Clients generated by the System Solution. The Business Entities are the End Users of the Dashboards and the Application Server that the System Solution provides to each Business Entity for managing the corresponding Application Clients.

Mobile Client Devices (cellular phones, smartphones, wearable devices, and tablets) and Non-Mobile Client Devices (laptops, desktops, and Internet-enabled TV sets) are coupled to the internet by wired (a physical interconnect), wirelessly (waves through space), or both wired/wireless networks. The wireless connectivity can be cellular (3G, 4G, etc.), Wi-Fi, Bluetooth, WiMax, etc. The network interconnecting these components is called the Communication network. The Client Device 1-2 has the Application Client which is the actual application software running on device. The term "Mobile" when used alone or in a larger phrase "Mobile Client Devices" can also imply the terms Mobile, Non-Mobile or in the Cloud. The term Mobile Client at times will be referred to as the Client Device. The term Application highlights the fact that the application built by the System Solution comprises a plurality of Application Components, and includes a portion of the Application that runs on the Client Device (the Application Client) and a portion of the application that runs on a server (the Application Server). The term "Application Client" refers to the portion of the application running on the Client Device. The term "Application Client" encompasses the Application Client running on a mobile Client Device, a non-mobile Client Device or even in the Cloud. The Cloud can run a portion of the Application Client in the server while the remaining portion of the Application Client can run on the Client Device, simultaneously. The term "Application Client" is used to refer to both Native and Non-Native Application Client. The term "Mobile Application Client" will be used for both Native and Non-Native Application Clients running on a mobile Client Device, but it also applies to Client Devices that are non-mobile or in the Cloud.

In all cases, the Application Clients provide the End User with a User Interface which provides the end user with at least one mode of input and at least one mode of output. The User Interface provides the means to the end users through which the end user navigates and interacts with the Application Client.

Each Application includes a family of Application Clients. Each Application Client is designed to run on a Client Device of a certain type, part of a plurality of Client Devices. The Client Devices in the plurality of Client Devices have different characteristics in terms of hardware, operating system, and "look and feel" of each device. In particular, each Client Device in the plurality of Client Devices may have a different screen in terms of resolution, aspect ratio, and size.

The family of Application Clients includes a set of Native Mobile Application Clients, one per mobile Client Device. The family of Application Clients also includes a set of Native Non-Mobile Application Clients, one per non-mobile Client Device. The family of Application Clients also includes Non-Native Mobile and Non-Mobile Application Clients, and Cloud Application Clients residing in the Cloud. Native, Non-Native, and Cloud Application Clients can be automatically generated by the System Solution.

A Native Application Client executable depends on the operating system of the Client Device on which the Native Application Client is running on. Thus, the executable of a Native Application Client to run on different Client Devices may be different. The set of automatically generated Native Mobile Application Clients provides a Native Mobile Application Client per each mobile Client Device which the Mobile Application is desired to run on. The executable of a Native Mobile Application Client designed to run on a first mobile Client Device is generated to run on the operating system of the first mobile Client Device and may be different from the executable of a Native Mobile Application Client designed to run on a second mobile Client Device. The executable of a Native Non-Mobile Application Client designed to run on a first non-mobile Client Device is generated to run on the operating system of the first non-mobile Client Device and may be different from the executable of a Native Non-Mobile Application Client designed to run on a second non-mobile Client Device.

The User Interface of a Native Application Client to run on different Client Devices may be different. The User Interface of a Native Application Client depends on the operating system, the hardware, and the "look and feel" of each Client Device. In particular, the User Interface depends on the characteristics of the screen of each Client Device in terms of screen resolution, aspect ratio, and size. The User Interface of a Native Mobile Application Client designed to run on a first mobile Client Device is adapted to the characteristics in terms of operating system, hardware and "look and feel of the first mobile Client Device and may be different from the User Interface of a Native Mobile Application Client designed to run on a second mobile Client Device, which is adapted to the characteristics in terms of operating system, hardware and "look and feel of the second mobile Client Device. The User Interface of a Native Non-Mobile Application Client designed to run on a first non-mobile Client Device is adapted to the characteristics in terms of operating system, hardware and "look and feel of the first non-mobile Client Device and may be different from the User Interface of a Native Non-Mobile Application Client designed to run on a second non-mobile Client Device, which is adapted to the characteristics in terms of operating system, hardware and "look and feel of the second non-mobile Client Device. The User Interface of a Native Application Client must be adapted to the characteristics in terms of operating system, hardware, and look and feel of each Client Device on which the Native Application Client is desired to run.

A Non-Native Application Client does not depend on the operating system of the Client Device on which the Non-Native Application Client is running on, since it runs on the Web Browser that is running on each Client Device. However, the User Interface of a Non-Native Application Client to run on different Client Devices may be different. The User Interface of a Non-Native Application Client depends on the hardware and the "look and feel" of each Client Device. In particular, the User Interface depends on the characteristics of the screen of each Client Device in terms of screen resolution, aspect ratio, and size. The User Interface of a Non-Native Application Client must be adapted to the characteristics in terms of hardware and look and feel of each Client Device on which the Non-Native Application Client is desired to run. The Non-Native Application Client is written in a programming language that is understood by the web browser running on the Client Device. Typically, such a programming language, for example HTML5, provides certain functionality that allows the web browser running on the Client Device to adapt the User Interface of the Non-Native Application Client to the characteristics of the Client Device. However, because of possible limitations in the adaptation capabilities that the web browser running on the Client Device provides, the "adapted" User Interface may not offer the same user experience in all Client Devices.

The automatic generation of the set of Native Mobile Application Clients, the set of Native Non-Mobile Application Clients, Non-Native Application Clients, and Cloud Application Clients requires a Client Translator and Generator that translates a User Interface of an Application Client designed to run on a Reference Client Device into a User Interface of an Application Client designed to run on each Client Device in the plurality of Client Devices of different types which the Application Client is desired to run on. The Reference Client Device may be one of the Client Devices that the Application Client is desired to run on. The User Interface which is translated to run on a Client Device must adapt to the characteristics of the Client Device in terms of operating system, hardware, in particular screen resolution, size, and aspect ratio, and "look and feel.

The process of translating the User Interface from a User Interface designed for a Reference Client Device to a User Interface adapted to the characteristics in terms of operating system, hardware, and look and feel for each Client Device that an Application Client is desired to run on is very complex because of the broad differences in the characteristics of each Client Device. Also, the User Interface is a very important part of the user experience that the Application Client provides to the end user, since it provides the "sensorial" experience (especially visual) of the interaction with the Application Client. Since end users have scarce tolerance for imperfections in the User Interface visual aspects and behavior, the translated User Interface for each Client Device must be of very "high quality" in order to offer the same user experience in all Client Devices.

The user experience offered by an Application Client on a Client Device is the result of many factors, many of the factors qualitative in nature, since the user experience is a qualitative experience. For example, pictures and videos displayed by a User Interface should not look distorted. Text should use proper fonts and font sizes, be well-spaced and not truncated. Buttons and other navigation elements should be properly spaced, and follow the look and feel of the Client Device. Embellishment effects such as shapes, outlines, and shadows should be properly displayed. The "composition" of the User Interface, i.e., the relationship among the different graphical elements displayed by the User Interface should be visually pleasant in all Client Devices. For example, the different elements displayed by the User Interface should not look too large or too small, areas of the screen should not look unnaturally empty, the distance between any two elements should be similar in relative terms on all Client Devices, elements that do not overlap in the Reference Client Device User Interface should not overlap in any User Interface, etc.

Because of the wide variation in the characteristics of different Client Devices in terms of operating system, hardware, and "look and feel," a first User Interface that "looks good" on a first Client Device may "look poor" when the first User Interface is translated to a second Client Device. For example, a set of buttons that appear properly spaced when displayed on the first Client Device, may appear too closely-spaced when displayed on the second Client Device, and the end user may find them awkward to use them on the second Client Device. Another example is a picture that may appear properly sized when displayed on a first Client Device, but may appear distorted when displayed on a second Client Device featuring a screen of a different aspect ratio than the first Client Device. Especially in mobile Client Devices, which use screens of relatively small sizes and typically run Application Clients with User Interfaces that are very carefully designed and highly fine-tuned, even small changes in the elements or composition of the User Interfaces may be very noticeable and affect the user experience offered by the Application Client to the end user.

The problem of properly adapting a User Interface to the characteristics of Client Devices of different types is especially relevant for Native Application Clients. The problem also applies to a certain extent to Non-Native Application Clients. In the case of Non-Native Application Clients, the web browser running on the Client Device provides certain capabilities to adapt a Non-Native Application Client to the characteristics of the Client Device. However, the adaptation capabilities provided by the web browser running on a certain Client Device may be limited and the adaptation may not result in the same user experience in all Client Devices.

Since a User Interface "looks good" or does not "look good" on a Client Device based on a number of factors that are qualitative in nature, the "measurement" of the result of the User Interface translation to different Client Devices is difficult, since a "good" or "bad" translation also depends on factors that are qualitative in nature. However, certain metrics provide a quantitative estimate of the quality of the User Interface translation.

Figure 5:
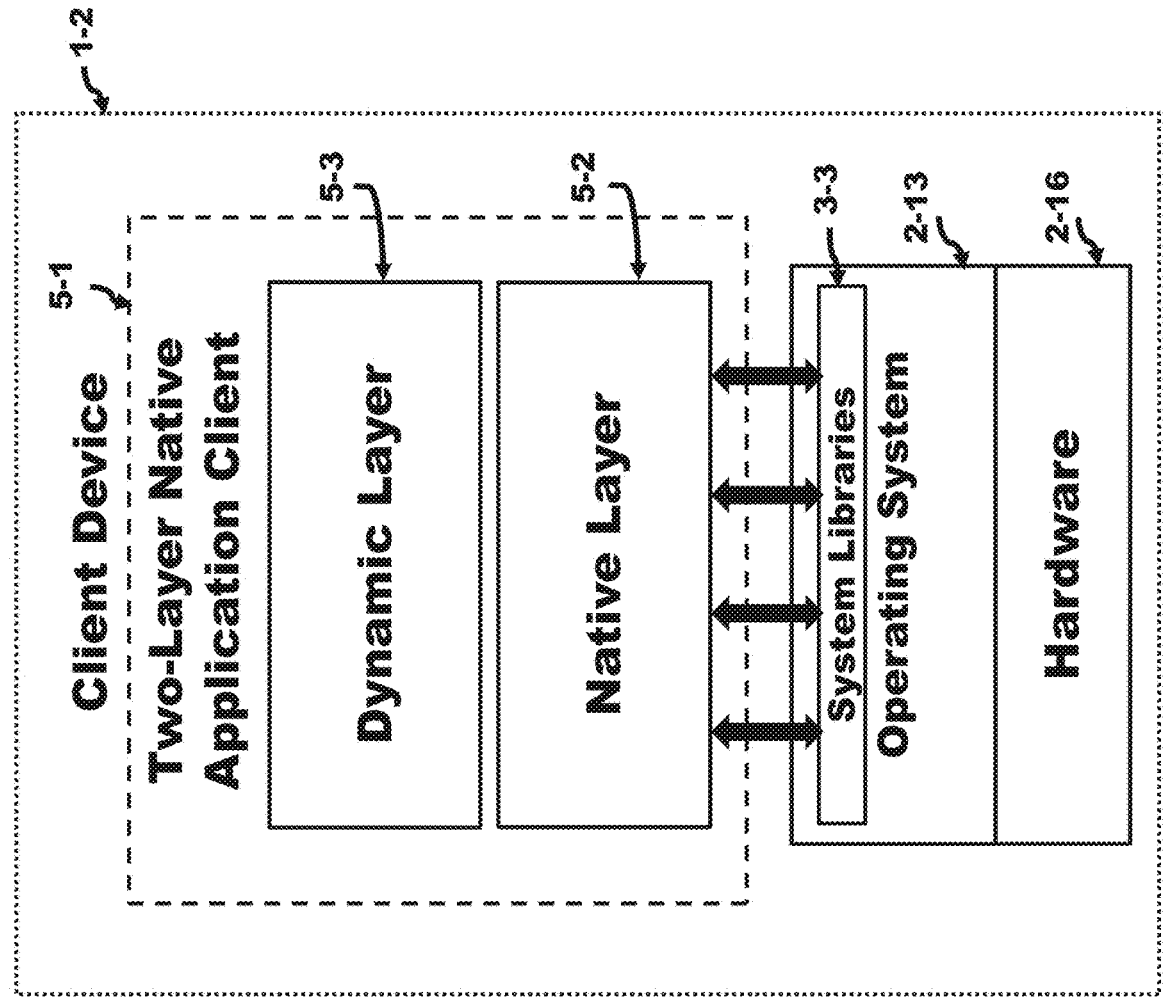
FIG. 5 depicts a Two-Layer Native Application Client in accordance with the present invention.

FIG. 5 depicts a Two-Layer Native Application Client 5-1 which is a Native Application Client that consists of two layers: a Dynamic Layer 5-3 and a Native Layer 5-2. The Native Layer 5-2 runs directly on the operating system 2-13 of the Client Device 1-2 by using the system libraries 3-3 that are part of the operating system 2-13. The Dynamic Layer 5-3 does not run directly on the operating system 3-3, but instead runs on the Native Layer 5-2 by making use of software libraries and functional blocks provided in the Native Layer 5-2. The Native Layer 5-2 is an executable that depends on the Client Device 1-2 and needs to be downloaded and installed on the Client Device 1-2 using an installation manager external to the Two-Layer Native Application Client 5-1. The Native Layer 5-2 needs to be downloaded from the application store. The Dynamic Layer 5-3 does not need to be downloaded from the application store, but can be downloaded directly from an Application Server that is part of the System Solution. We use the term "Dynamic Native Application Client" as synonymous of the term "Two-Layer Native Application Client". The operating system runs on the hardware 2-16.

Figure 4:
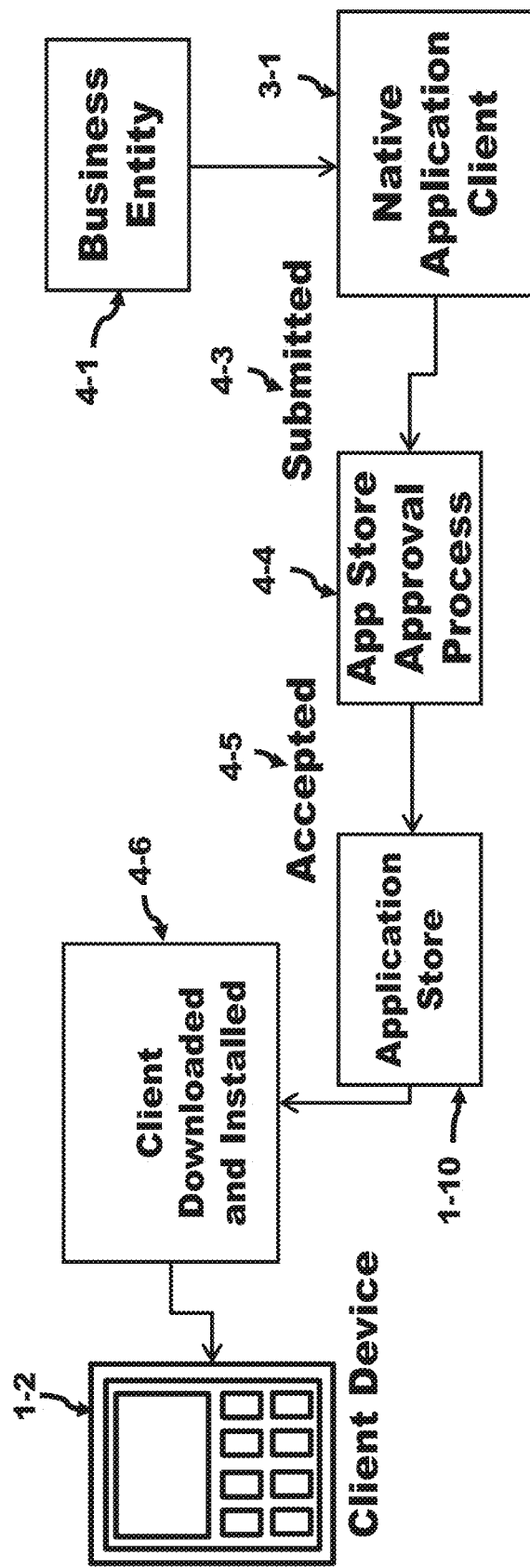
FIG. 4 shows the flow of how a Native Application Client is approved and downloaded by an Application Store to a Client Device.
Figure 6A:
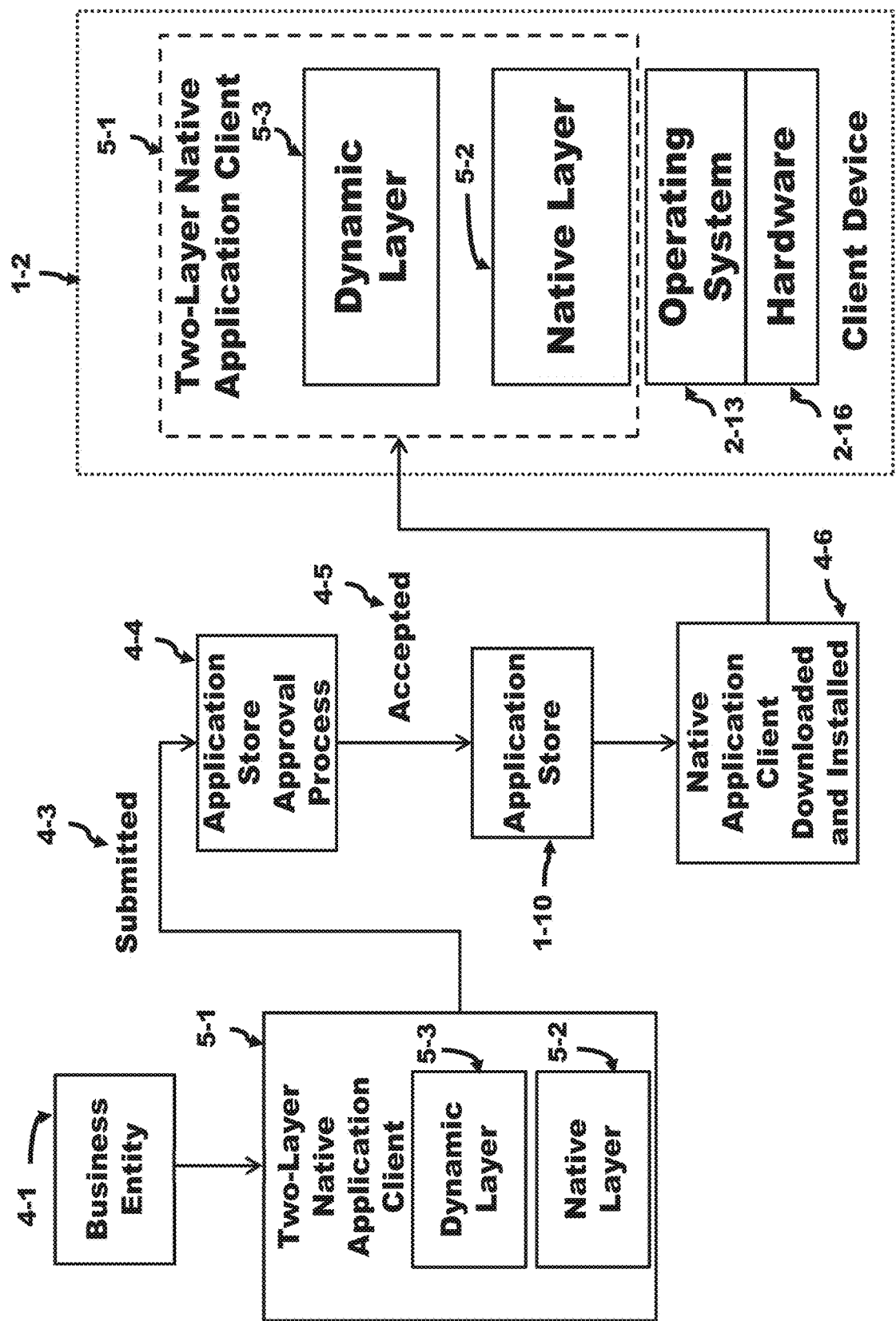
FIG. 6A shows a Two-Layer Application Client being downloaded to a Client Device for the first time in accordance with the present invention.

FIG. 6A illustrates the process of downloading the Two-Layer Native Application Client 5-1 to a Client Device 1-2 for the first time. This process is similar to the process of downloading a Native Application Client 3-1 to the Client Device depicted in FIG. 4. A Business Entity 4-1 creates a new application which comprises a Two-Layer Native Application Client 5-1. The new Two-Layer Native Application Client 5-1 is submitted 4-3 to the Application Store 1-10 for an approval process 4-4. Once the new Two-Layer Native Application Client is accepted 4-5, information is passed to the Application Store 1-10 to make the new Two-Layer Native Application Client available for download into a Client Device 1-2. A Client Device 1-2 which desires the Two-Layer Native Application Client 5-1 downloads the Two-Layer Native Application Client from the corresponding application store 1-10. Once the Two-Layer Native Application Client is downloaded to the Client Device, it is installed 4-6 on the Client Device so it can run on the operating system 2-13 of the Client Device. The Two-Layer Native Mobile Application Client 5-1 executable depends on the operating system (OS) as an iPhone would require a different executable than an Android™ phone. If the Business Entity modifies the Native Layer 5-2, it needs to submit the new version of the Native Layer 5-2 to the application store for re-approval in order to make it available for download to the Client Device. In order to install the updated version of the Native Layer on the Client Device, the existing version of the Native Layer, if running on the Client Device 1-2, must be stopped and deleted from the memory of the Client Device 1-2 in order for the new version of the Native Layer to be installed on the Client Device. The Native Layer cannot be updated "on the fly" while the Native Application Client 5-1 is running on the Client Device 1-2. The Dynamic Layer 5-1 runs on the Native Layer 5-2.

Figure 6B:
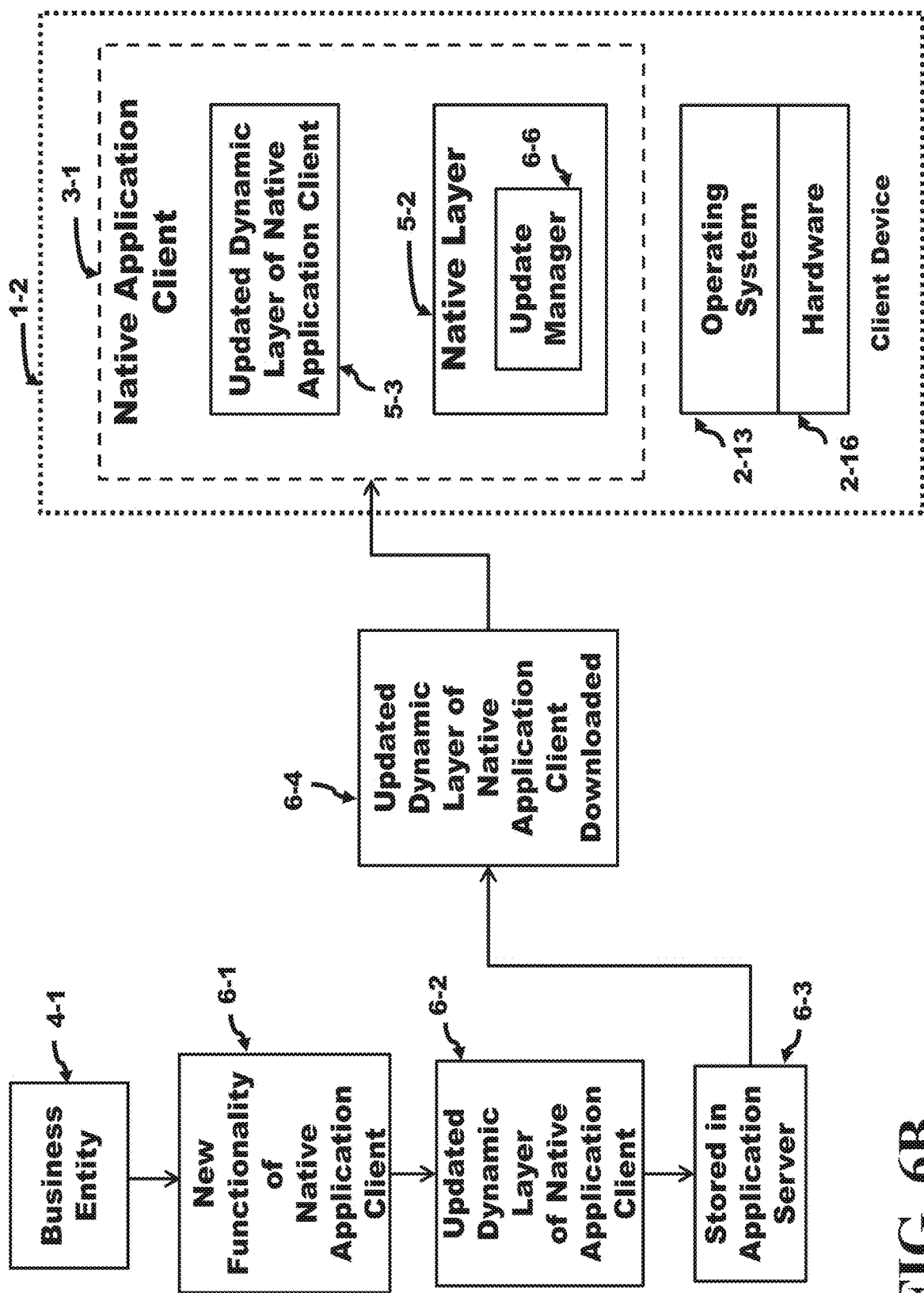
FIG. 6B presents a Dynamic Layer a Two-Layer Application Client being downloaded to a Client Device in accordance with the present invention.

FIG. 6B illustrates the process of downloading an updated Dynamic Layer 6-4 to the Client Device. If the Business Entity 4-1 modifies the Dynamic Layer 5-1 and creates an Updated Dynamic Layer 6-2, it can make it available for download 6-4 directly from an Application Server 6-3 that is part of the System Solution or is owned by the Business Entity. The new version 6-2 of the Dynamic Layer 5-3 is made available for download to the Client Device without having the Business Entity submit it for approval to the application store 1-10. The updated Dynamic Layer 6-2 can be downloaded and installed 6-4 in the Client Device 1-2 while the Two-Layer Native Application Client 5-1 is running on the Client Device. The update of the existing Dynamic Layer can be achieved using an update manager 6-6 that is internal in the Native Layer 5-2 of the Two-Layer Native Application Client 3-1. Once the Updated Dynamic Layer 5-3 is installed on the Client Device 1-2, the new application client functionality and new user experience is provided to the end user. The Native Layer 5-2 runs on the operating system 2-13 which in turn runs on the hardware 2-16.

Figure 7:
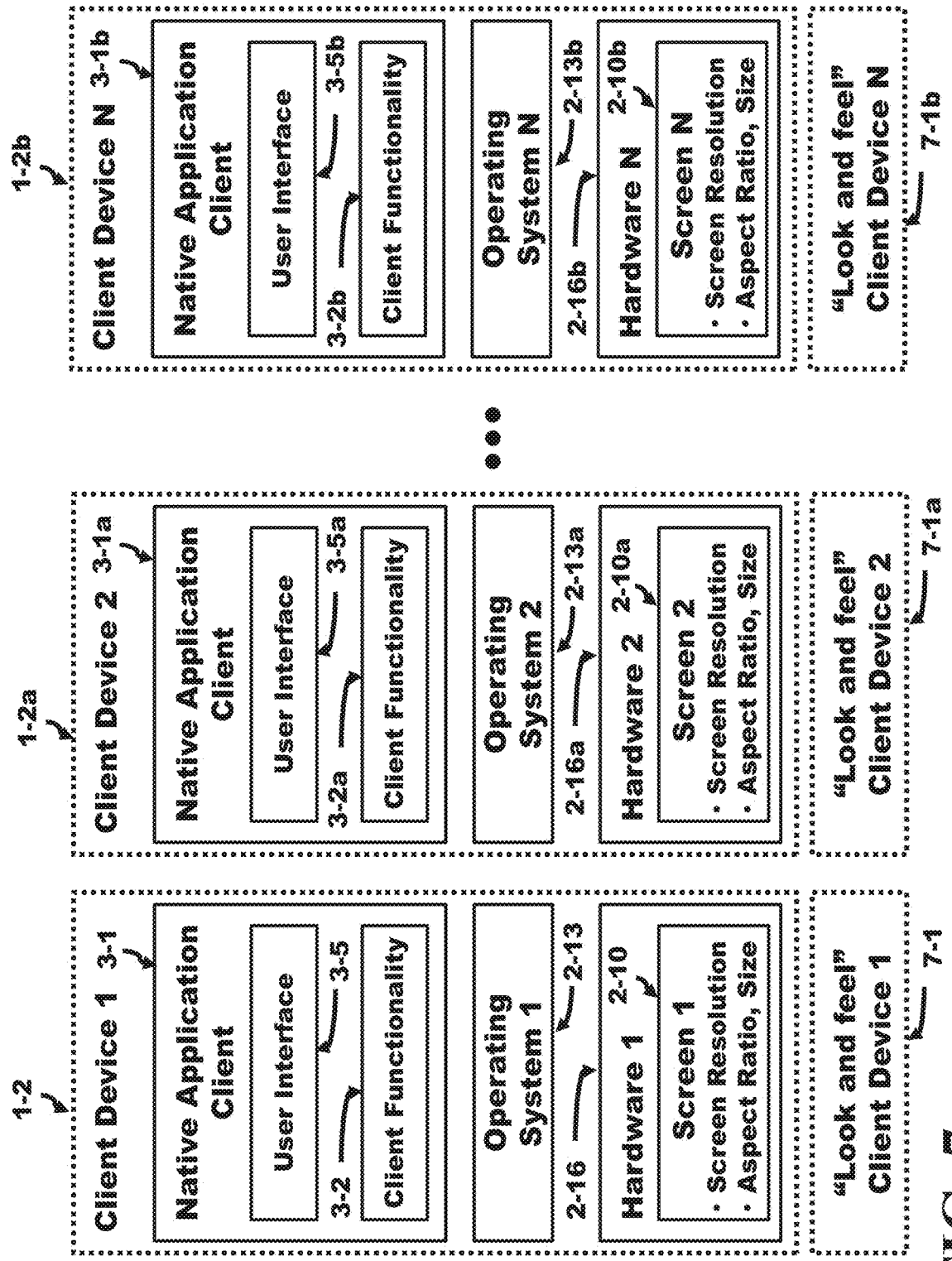
FIG. 7 shows different Native Application Client Devices having different Operating Systems and different Hardware in accordance with the present invention.

FIG. 7 illustrates a plurality of Client Devices comprising Client Device 1 1-2 to Client Device N 1-2b. Each Client Device is of a different Client Device type and different characteristic, such as hardware, operating system, and "look and feel" of each device. For example, a first Client Device can be an iPhone 4™, a second Client Device can be an iPhone 5™, a third Client Device can be an iPad™, a fourth Client Device can be an iPad Mini™, a fifth Client Device can be a Samsung Galaxy II™ smartphone running the Android™ operating system, a sixth Client Device can be a Nokia Lumia™ smartphone running the Windows Mobile™ operating system, a seventh Client Device can be a Samsung Notes™ tablet with 10" screen running the Android™ operating system, an eighth Client Device can be a Samsung Notes™ tablet with 7" screen running the Android™ operating system, a ninth Client Device can be a Dell™ laptop, and so on. Client Device 1 1-2 comprises an Operating System 1 2-13 and a Hardware 1 2-16 which comprises a Screen 1 2-10 with a certain Screen Resolution, Aspect Ratio and Size. Client Device 1 has a certain "Look and Feel" Client Device 1 7-1. Client Device 2 1-2a comprises an Operating System 2 2-13a and a Hardware 2 2-16a which comprises a Screen 2 2-10a with a certain Screen Resolution, Aspect Ratio and Size. Client Device 2 has a certain "Look and Feel" Client Device 2 7-1a. Client Device N 1-2b comprises an Operating System N 2-13b and a Hardware N 2-16b which comprises a Screen N 2-10b with a certain Screen Resolution, Aspect Ratio and Size. Client Device N has a certain "Look and Feel" Client Device N 7-1*b*. Operating System 1 2-13 may differ from Operating System 2 2-13*a*, which in turn may differ from Operating System N 2-13*b*. Hardware 1 2-16 may differ from Hardware 2 2-16*a*, which in turn may differ from Hardware N 2-16*b*. Specifically, Screen 1 2-10 may differ from Screen 2 2-10*a*, which in turn may differ from Screen N 2-10*b* in terms of screen resolution, or aspect ratio and size. "Look and feel" Client Device 1 7-1 may differ from "Look and feel" Client Device 2 7-1*a*, which in turn may differ from "Look and feel" Client Device N 7-1*b*.

The "Look and Feel" of a Client Device is due to the fact that the manufacturer of a certain operating system or Client Device encourages certain practices that developers of Application Client User Interfaces running on their devices should follow, so all Application Clients running on the Client Device have some general common behavior and an end user is comfortable even the first time he/she uses a User Interface of a new Application Client, since the end user can "navigate" the new Application Client, at least to some extent, by applying "knowledge" gained by navigating other Application Clients. The "Look and Feel" often depends on the operating system and on the device itself. For example, the "look and feel" of an iPhone™ is different from the "look and feel" of a device running the Android™ operating system or from a device running the Blackberry™ operating system. The "look and feel" of an iPhone™ is also slightly different from the "look and feel" of an iPad™, even if the two devices run the same operating system. For example, in an Application Client running on an iPhone, the Tab Bar is typically at the bottom of the screen, in an Application Client running on Android phone can be at the top. Another example is that in an Application Client running on iPhone there is a "Home" button in the User Interface to go back to a main landing page in the Application Client. In an Application Client running on many Android Client Devices, typically there is no "Home" button because there is a physical "Home" button in the Client Device. In another example, in an Application Client running on iPhone, when displaying a choice menu asking the end user for a "Yes" or "No" answer, the "Yes" is on the left, in Android, the "Yes" is on the right.

A Native Application Client executable depends on the operating system of the Client Device on which the Native Application Client is running on. Thus, the executable of a Native Application Client to run on different Client Devices may be different. For example, the executable of the Native Application Client 3-1 to run on Client Device 1 1-2 may be different from the executable of the same Native Application Client 3-1*a* to run on Client Device 2 1-2*a*, which in turn may be different from the executable of the same Native Application Client 3-1*b* to run on Client Device N 1-2*b*.

The User Interface of a Native Application Client when run on different Client Devices may be different. The User Interface of a Native Application Client depends on the operating system, the hardware, and the "look and feel" of each Client Device. In particular, the User Interface depends on the characteristics of the screen of each Client Device in terms of screen resolution, aspect ratio, and size. For example, the User Interface 3-5 of the Native Application Client 3-1 to run on Client Device 1 1-2 may be different from the User Interface 3-5*a* of the same Native Application Client 3-1*a* to run on Client Device 21-2*a*, which in turn may be different from the User Interface 3-5*b* of the same Native Application Client 3-1*b* to run on Client Device N 1-2*b*. The User Interface of a Native Application Client must be adapted to the characteristics in terms of operating system, hardware, and look and feel of each Client Device on which the Native Application Client is desired to run. Each Native Application Client includes a Client Functionality 3-2, 3-2*a* and 3-2*b*, respectively.

Figure 8:
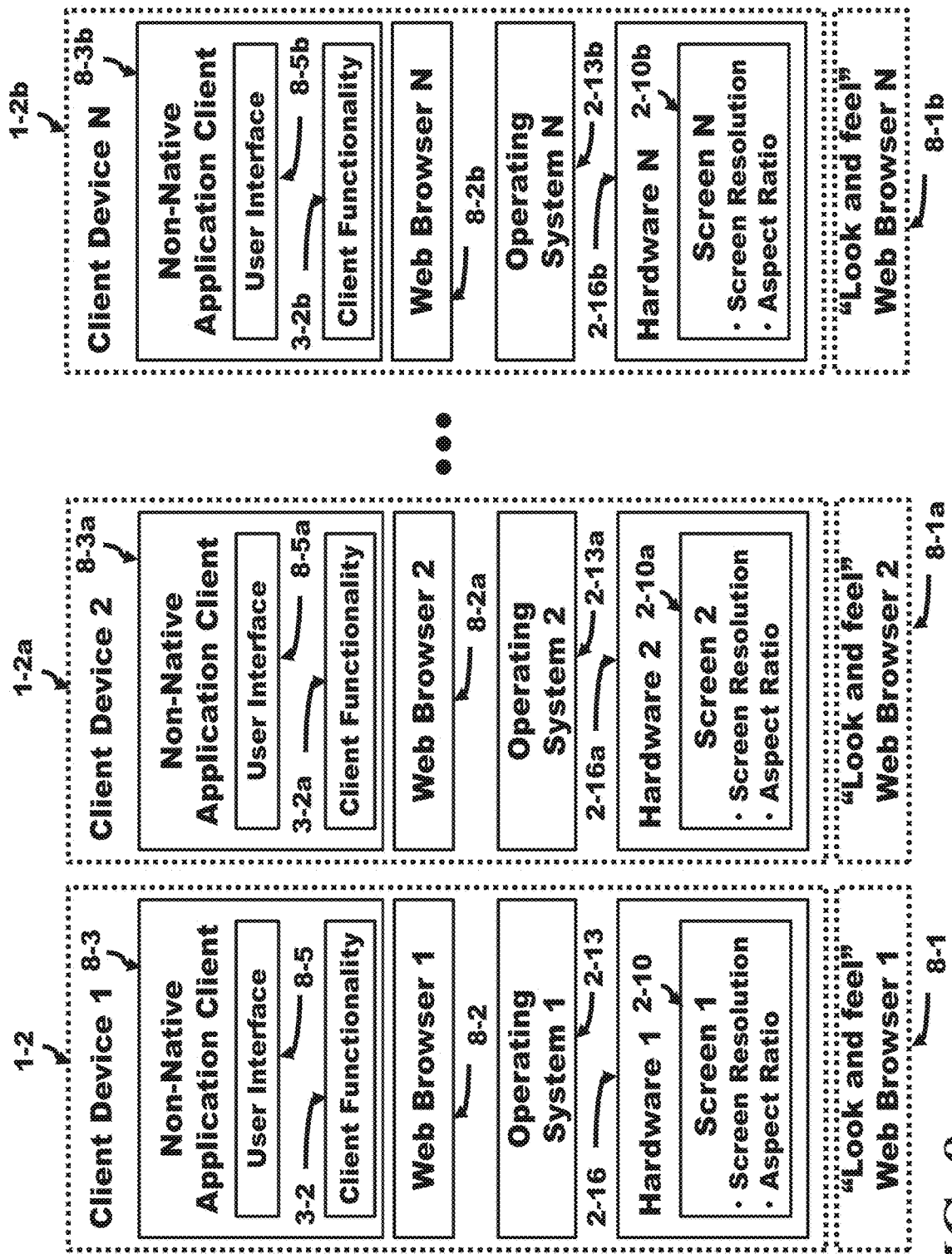
FIG. 8 illustrates shows different Non-Native Application Client Devices having different Operating Systems and different Hardware in accordance with the present invention.

FIG. 8 is similar to FIG. 7, but addresses the case of Non-Native Application Clients. FIG. 8 illustrates the same plurality of Client Devices comprising Client Device 1 1-2 to Client Device N 1-2*b* shown in FIG. 7, each Client Device of a different Client Device type and different characteristic, such as hardware, operating system, and "look and feel" of each device.

A Non-Native Application Client does not depend on the operating system of the Client Device on which the Non-Native Application Client is running on, since it runs on the Web Browser 1 8-2, Web Browser 2 8-2*a*, and Web Browser 3 8-2*b* that is running on each Client Device. The Web Browser running on each Client Device supports the "look and feel" of each device. The User Interface of a Non-Native Application Client to run on different Client Devices may be different. The User Interface of a Non-Native Application Client 8-3 to 8-3*b* depends on the hardware 2-16 to 2-16*b*, respectively, and the "look and feel" 8-1 to 8-1*b*, respectively of each Client Device. In particular, the User Interface depends on the characteristics of the screen of each Client Device in terms of screen resolution, aspect ratio, and size. For example, the User Interface 8-5 of the Non-Native Application Client 8-3 to run on Client Device 1 1-2 may be different from the User Interface 8-5*a* of the same Non-Native Application Client 8-3*a* to run on Client Device 2 1-2*a*, which in turn may be different from the User Interface 8-5*b* of the same Non-Native Application Client 8-3*b* to run on Client Device N 1-2*b*. The User Interface of a Non-Native Application Client must be adapted to the characteristics in terms of hardware and look and feel of each Client Device on which the Non-Native Application Client is desired to run. The Non-Native Application Client is written in a programming language that is understood by the web browser running on the Client Device. Typically, such a programming language, for example HTML5, provides certain functionality that allows the web browser running on the Client Device to adapt the User Interface of the Non-Native Application Client to the characteristics of the Client Device. However, because of possible limitations in the adaptation capabilities that the web browser running on the Client Device provides, the "adapted" User Interface may not offer the same user experience in all Client Device 1 1-2 comprises an Operating System 1 1 2-13 and a Hardware 1 1 2-16 which comprises a Screen 1 2-10 with a certain Screen Resolution, Aspect Ratio and Size. Client Device 1 has a certain "Look and Feel" for Web browser 1 Client Device 1 8-1. Client Device 2 1-2*a* comprises an Operating System 2 2-13*a* and a Hardware 2 2-16*a* which comprises a Screen 2 2-10*a* with a certain Screen Resolution, Aspect Ratio and Size. Client Device 2 has a certain "Look and Feel" for Web browser 2 Client Device 2 8-1*a*. Client Device N 1-2*b* comprises an Operating System N 2-13*b* and a Hardware N 2-16*b* which comprises a Screen N 2-10*b* with a certain Screen Resolution, Aspect Ratio and Size. Client Device N has a certain "Look and Feel" for Web browser N Client Device N 8-1*b*. Each Non-Native Application Client includes a Client Functionality 3-2, 3-2*a* and 3-2*b*, respectively. Each Non-Native Application Client includes a Client Functionality 3-2, 3-2*a* and 3-2*b*, respectively.

Figure 9:
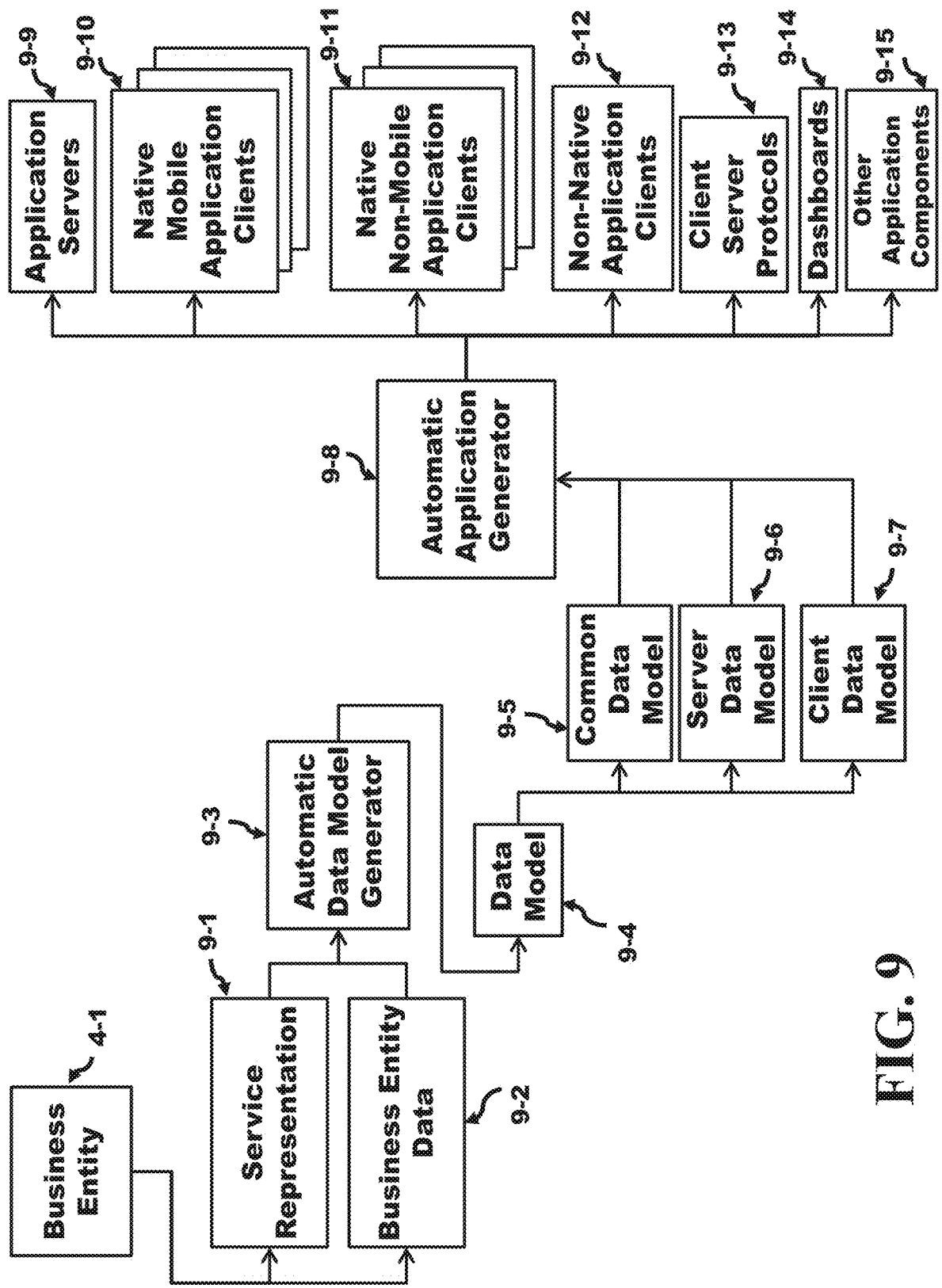
FIG. 9 depicts Applications and Application Clients being generated automatically in accordance with the present invention.

FIG. 9 depicts a method and apparatus to automatically generate an Application consisting of several Application Components. A Business Entity 4-1 defines a Service Representation 9-1 and Business Entity Data 9-2. An Automatic Data Model Generator 9-3 takes the Service Representation 9-1 and the Business Entity Data 9-2 as inputs and automatically generates a Data Model 9-4, and from the Data Model 9-4 it generates a Common Data Model 9-5, a Server Data Model 9-6 and a Client Data Model 9-7. Using the generated Common Data Model 9-5, Server Data Model 9-6, and Client Data Model 9-7, an Automatic Application Generator 9-8 automatically generates all the Application Components. The generated Application Components include an Application Server 9-9, a set of Native Mobile Application Clients 9-10, a set of Native Non-Mobile Application Clients 9-11, a set of Non-Native Application Clients 9-12, Client Server Protocols 9-13, Dashboards 9-14, and Other Application Components 9-15.

The method and apparatus depicted in FIG. 9 is explained in detail in U.S. patent application Ser. No. 13/833,589 titled "Apparatus for Single Workflow for Multi-Platform Mobile Application Creation and Delivery" filed on Mar. 15, 2013, in U.S. patent application Ser. No. 13/833,669 titled "Method for Single Workflow for Multi-Platform Mobile Application Creation and Delivery" filed on Mar. 15, 2013, and in U.S. patent application Ser. No. 13/833,849 titled "Dynamic User Interface Delivery System" filed on Mar. 15, 2013, which are incorporated in reference in their entirety. What is relevant in this application is that the set of generated Native Mobile Application Clients 9-10 comprises a Native Mobile Application Client executable for each mobile Client Device that the Native Mobile Application Client is desired to run on. The User Interface of each Native Mobile Application Client in the set of generated Mobile Application Clients 9-10 is adapted to the characteristics in terms of operating system, hardware, and look and feel of the corresponding mobile Client Device that the Native Mobile Application Client is desired to run on. The set of generated Native Non-Mobile Application Clients 9-11 comprises a Native Non-Mobile Application Client executable for each non-mobile Client Device that the generated Native Mobile Application Client is desired to run on. The User Interface of each Native Non-Mobile Application Client in the set of Non-Mobile Application Clients 9-11 is adapted to the characteristics in terms of operating system, hardware, and look and feel of the corresponding non-mobile Client Device that the Native Mobile Application Client is desired to run on. The User Interface of the Non-Native Application Clients 9-12 is adapted to the characteristics in terms of hardware and look and feel of the corresponding Client Device that the Native Mobile Application Client is desired to run on.

Figure 10:
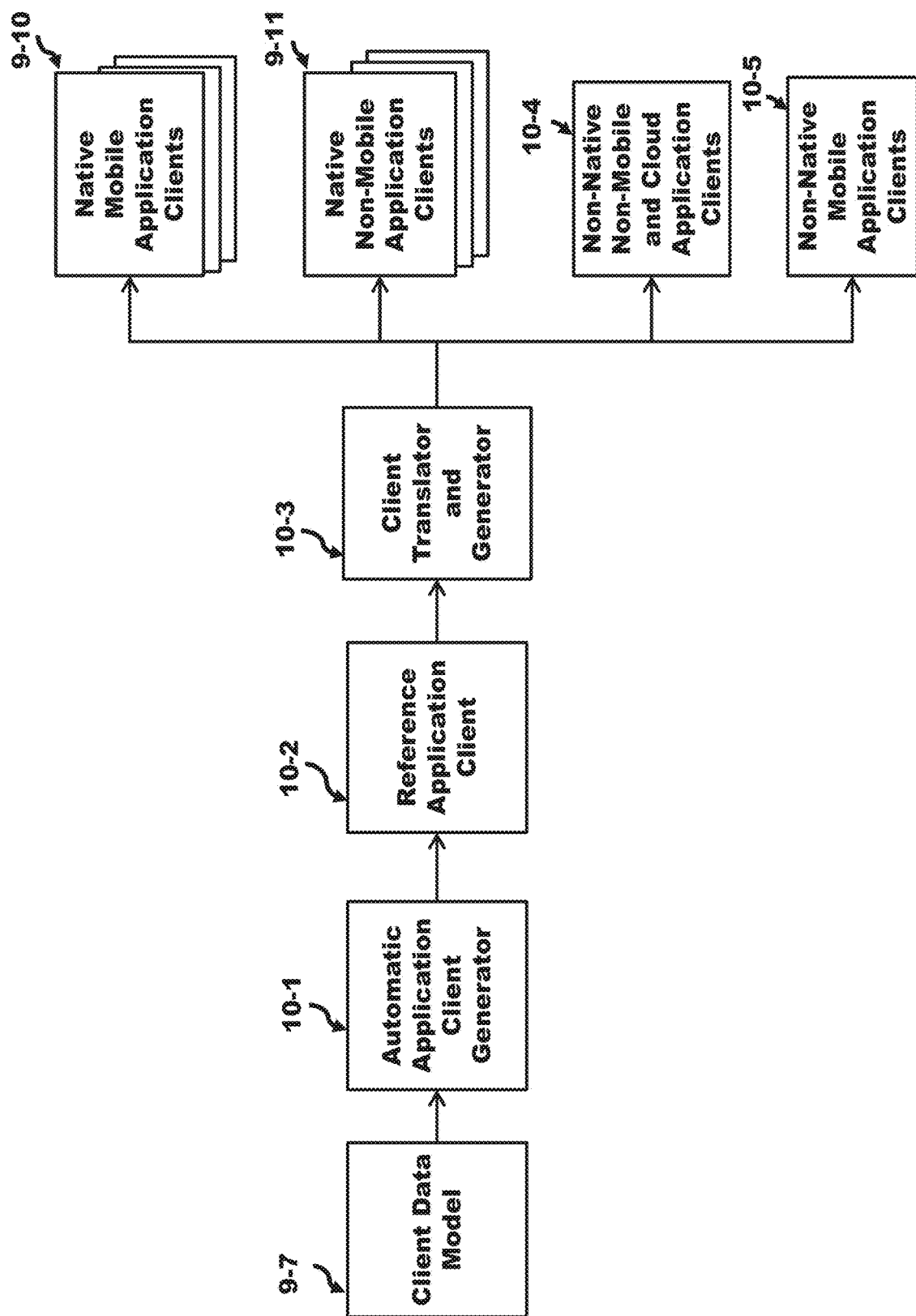
FIG. 10 illustrates the flow to generate Application Clients from a Reference Application Client in accordance with the present invention.

FIG. 10 provides further detail of the Automatic Client Generation process, which is part of the method and apparatus depicted in FIG. 9. From the Client Data Model 9-7, the Automatic Application Client Generator 10-1, which is part of the Automatic Application Generator 9-8, first automatically generates a Reference Application Client 10-2. The Reference Application Client 10-2 is an Application Client whose executable is compiled to run on a Reference Client Device and whose User Interface is adapted to the characteristics in terms of operating system, hardware, and look and feel of the Reference Client Device. The Reference Client Device may be one of the Client Devices that the Application Client is desired to run on. For example, the iPhone 5™ may be picked as the Reference Client Device, and the Reference Application Client 10-2 is generated and adapted to run on the iPhone 5™. Once the Reference Application Client 10-2 is generated, the Client Translator and Generator 10-3 translates the executable and User Interface and generates the set of Native Mobile Application Clients 9-10, the set of Native Non-Mobile Application Client 9-11, the Non-Native Mobile Application Clients 10-5, and the Non-Native Non-Mobile and Cloud Application Clients 10-4 for all the Client Device on which the Application Client is desired to run on.

The process of translating the User Interface from a User Interface designed for the Reference Client Device to a User Interface adapted to the characteristics in terms of operating system, hardware, and look and feel for each Client Device that an Application Client is desired to run on is very complex because of the broad differences in the characteristics of each Client Device. This problem is especially relevant for Native Application Clients. The problem also applies to a certain extent to Non-Native Application Clients. In the case of Non-Native Application Clients, the web browser running on the Client Device provides certain capabilities to adapt a Non-Native Application Client to the characteristics of the Client Device. However, the adaptation capabilities provided by the web browser running on a certain Client Device may be limited and the adaptation may not result in the same user experience in all Client Devices.

FIG. 10 also shows that the Automatic Client Generation process, which is part of the method and apparatus depicted in FIG. 9, first automatically generates a Reference Application Client 10-2. The Reference Application Client 10-2 is an Application Client whose executable is compiled to run on a Reference Client Device and whose User Interface is adapted to the characteristics in terms of operating system, hardware, and look and feel of the Reference Client Device. The Reference Client Device may be one of the Client Devices that the Application Client is desired to run on. Once the Reference Application Client 10-2 is generated, the Client Translator and Generator 10-3 translates the executable and User Interface and generates the set of Native Mobile Application Clients 9-10, the set of Native Non-Mobile Application Client 9-11, the Non-Native Mobile Application Clients 10-5, and the Non-Native Non-Mobile and Cloud Application Clients 10-4 for all the Client Device on which the Application Client is desired to run on.

FIG. 11A and FIG. 11B provide details of the User Interface Translator 11-2, which is part of the Client Translator and Generator 10-3. In FIG. 11A, the User Interface Translator 11-2, translates a Reference Client Device User Interface 11-1 into a User Interface for Client Device 1 11-8. The Reference Client Device User Interface 11-1 is the User Interface designed to run on the Reference Client Device. The User Interface for Client Device 1 11-8 is a User Interface adapted to the characteristics of a first Client Device 1 in the plurality of Client Devices of different types which the Application Client is desired to run on. In the translation process, the User Interface Translator 11-2 uses the characteristics of Reference Client Device Screen 11-10 in terms of resolution, aspect ratio, and size, the "Look and Feel" Reference Client Device 1 11-3, the characteristics of Client Device 1 Screen 1 11-4 in terms of resolution, aspect ratio, and size, and the "Look and Feel" Client Device 1 11-5 in order to perform the translation. FIG. 11B depicts the same process to translate the Reference Client Device User Interface 11-1 and generate a User Interface for Client Device 2 11-9, the User Interface for Client Device 2 11-9 being a user interface adapted to the characteristics of a second Client Device 2 in the plurality of Client Devices of different types which the Application Client is desired to run on, the Client Device 2 having different characteristics than Client Device 1. In this case, the User Interface Translator uses the characteristics of Client Device 2 Screen 2 11-6 and the "Look and Feel" Client Device 2 11-7 to perform the translation. The User Interface Translator 11-2 uses a similar process to translate the Reference Client Device User Interface 11-1 and generate a User Interface adapted to the characteristics of each Client Device in the plurality of Client Devices which the Application Client is desired to run on. In the translation process, the User Interface Translator 11-2 uses the characteristics of Reference Client Device Screen 11-10 in terms of resolution, aspect ratio, and size, the "Look and Feel" Reference Client Device 1 11-3, the characteristics of Client Device 1 Screen 1 11-6 in terms of resolution, aspect ratio, and size, and the "Look and Feel" Client Device 1 11-7 in order to perform the translation.

Figure 12:
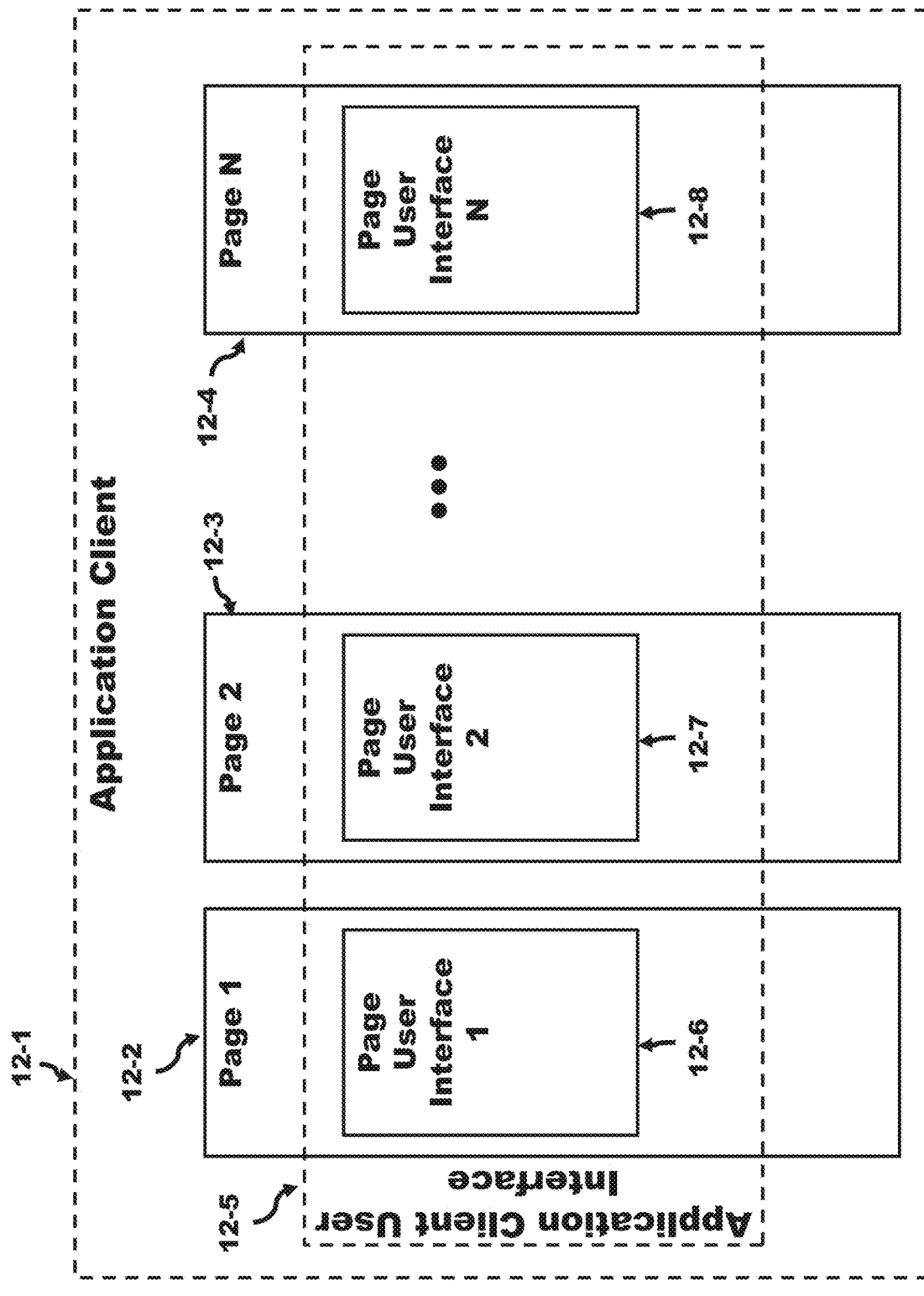
FIG. 12 depicts the structure of the Application Client in accordance with the present invention.

FIG. 12 shows the structure of an Application Client 12-1, including a Native and a Non-Native Application Client. The Application Client 12-1 comprises a plurality of Pages comprising Page 1 12-2 to Page N 12-4. Each Page in the plurality of Pages 12-2 to 12-4 includes a Page User Interface 12-6 to 12-8. The Application Client User Interface 12-5 consists of the Page User Interface of all Pages comprised in the Application Client.

Figure 13:
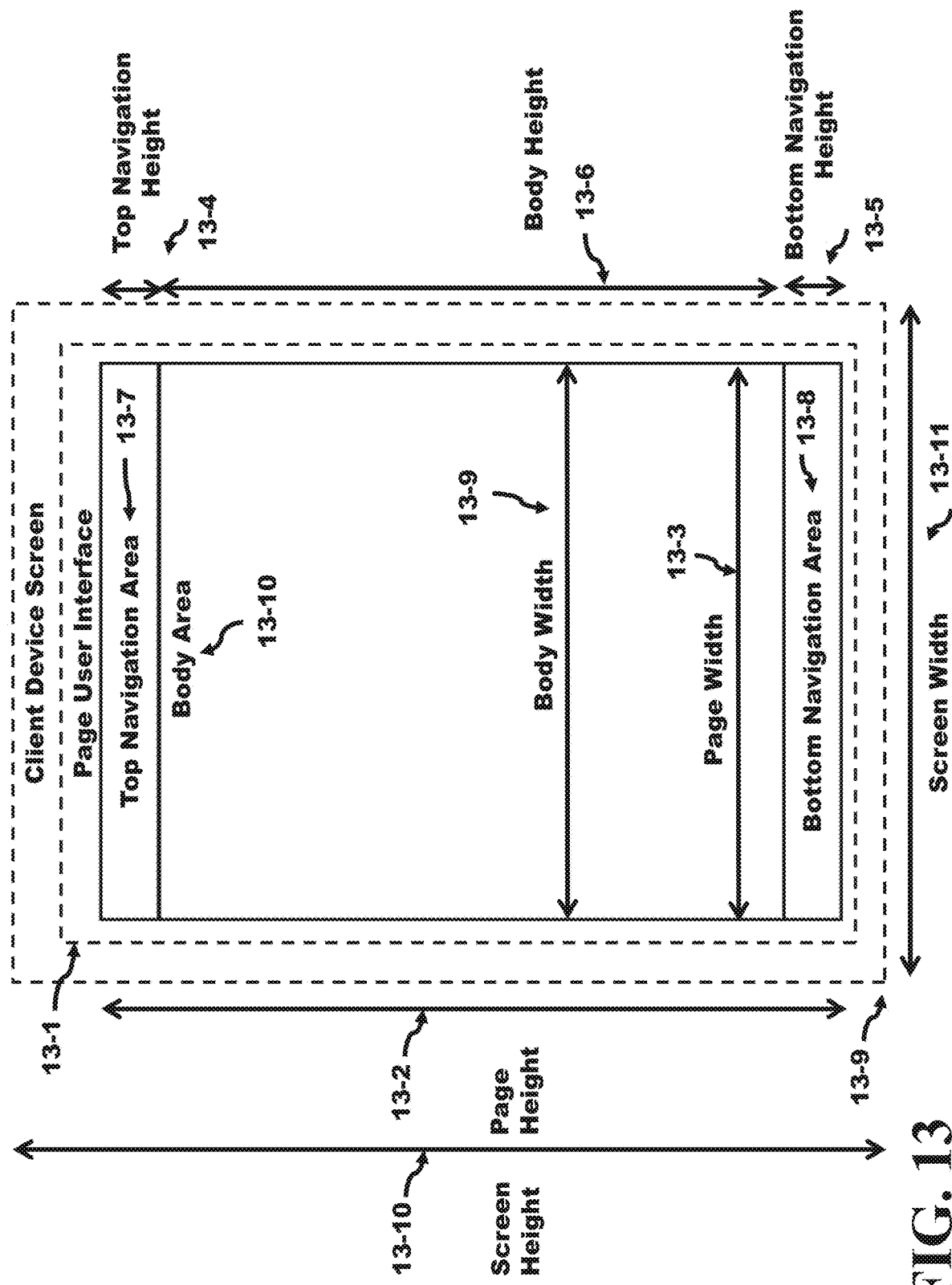
FIG. 13 illustrates the structure of a Page in accordance with the present invention.

FIG. 13 shows the structure of a Page User Interface 13-1 in the plurality of Page User Interfaces comprised in the Application Client 12-1. The Page User Interface has a size defined by the Page Height 13-2 and Page Width 13-3. It is understood that the Page Height 13-2 and Page Width 13-3 may differ from the Screen Height 13-10 and Screen Width 13-11 which define the size of the actual physical Client Device Screen 13-9 because the "Usable Area" of the Client Device Screen 13-9, which corresponds to the Page User Interface Size, may be smaller than the physical screen area. For example, in a smartphone, an area at the very top of the physical Client Device Screen is typically not usable by the Application Client User Interface, since it displays the battery and connectivity indicators of the Client Device. If the Usable Area of the Client Device is smaller than the physical screen area, a simple adjustment of the Screen Height and Screen Width must be made in order to derive the Page Height and Page Width. However, since this simple adjustment is well understood by those skilled in the art, we use the terms "Screen Height," "Screen Width," and screen size to refer to the height, width, and size of the Usable Area as well as the actual physical area of the screen.

The Page User Interface 13-1 comprises a Top Navigation Area 13-7 of height Top Navigation Height 13-4, a Bottom Navigation Area 13-8 of height Bottom Navigation Height 13-5 and a Body Area 13-10 of size determined by Body Width 13-9 and Body Height 13-6. The Top Navigation Area 13-7 may not be present, in which case the Body Area starts at the top of the Page User Interface. The Bottom Navigation Area 13-8 may not be present, in which case the Body Area ends at the bottom of the Page User Interface.

Figure 14:
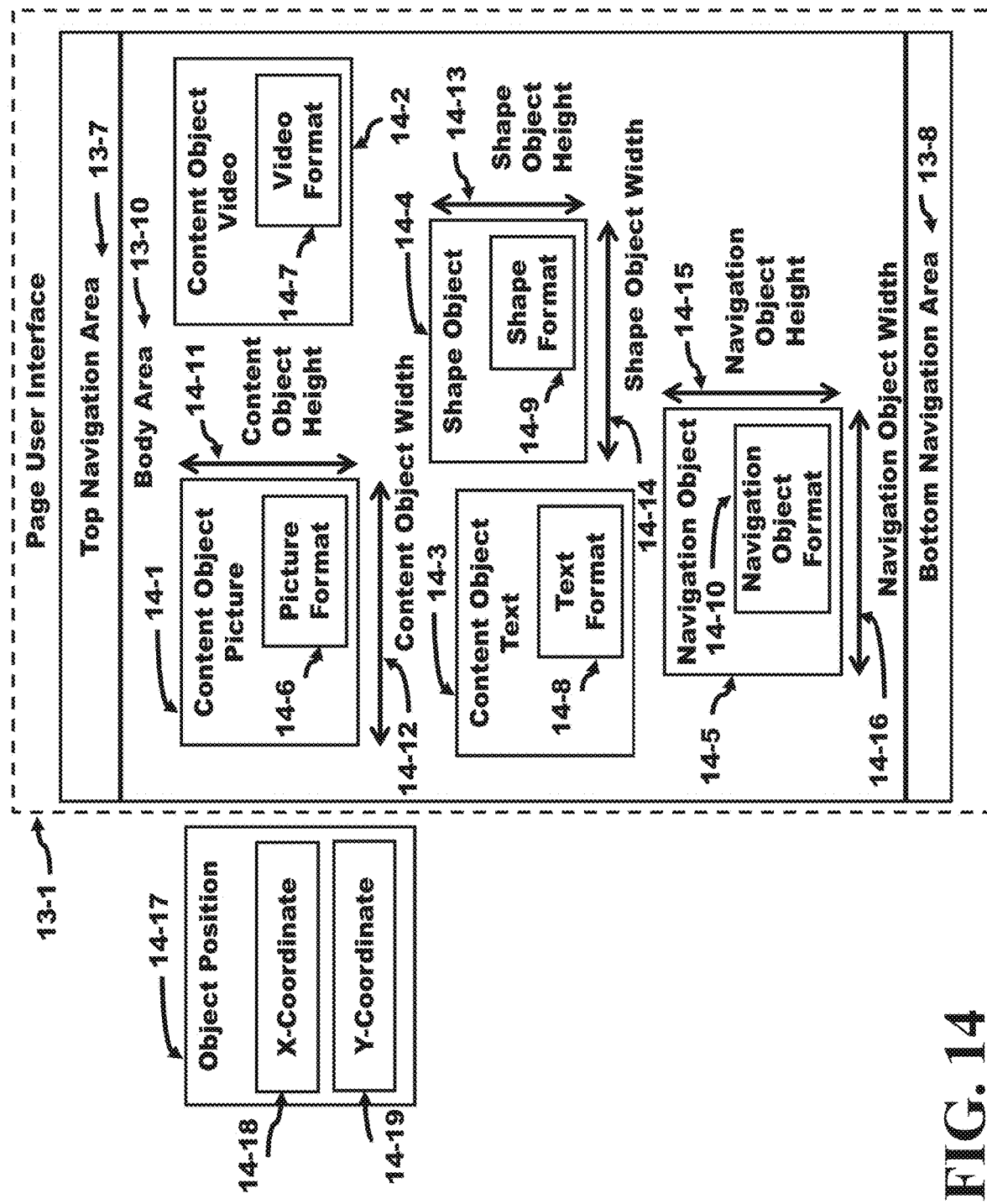
FIG. 14 depicts a Page containing different Objects in accordance with the present invention.

FIG. 14 shows the elements that may be displayed in a Body Area 13-10 of a Page User Interface 13-1. The Page User Interface 13-1 displays a plurality of Objects. Objects can be of different types. A plurality of Objects of each type can be displayed in the Body Area 13-10. Objects include an Object Position and an Object Format. The types of Objects include the following. A Content Object Picture 14-1, which contains a Picture, and includes a size defined by a Content Object Width 14-12 and a Content Object Height 14-11, an Object Position 14-17 defined by a X-Coordinate 14-18 and Y-Coordinate 14-19 of the top left corner of the object, and a Picture Format 14-6. A Content Object Video 14-2, which contains a Video, and includes a size defined by a Content Object Width 14-12 and a Content Object Height 14-11, an Object Position 14-17 defined by a X-Coordinate 14-18 and Y-Coordinate 14-19 of the top left corner of the object, and a Video Format 14-7. A Content Object Text 14-3, which contains a text box, which contains text, and includes a size defined by a Content Object Width 14-12 and a Content Object Height 14-11, an Object Position 14-17 defined by a X-Coordinate 14-18 and Y-Coordinate 14-19 of the top left corner of the object, and a Text Format 14-8. A Shape Object 14-4 which contains a Shape, and includes a size defined by a Shape Object Width 14-14 and a Shape Object Height 14-13, an Object Position 14-17 defined by a X-Coordinate 14-18 and Y-Coordinate 14-19 of the top left corner of the object, and a Shape Format 14-9. A Navigation Object 14-5 which contains a Button, or a Tab, or another Navigation Element and includes a size defined by a Navigation Object Width 14-16 and a Navigation Object Height 14-15, an Object Position 14-17 defined by a X-Coordinate 14-18 and Y-Coordinate 14-19 of the top left corner of the object, and a Navigation Object Format 14-10. For example, the Text Format 14-8 may include a Font, a Font Size, a Font Color, an Alignment, a Font Style, a Truncation, a Spacing between Words, and a Spacing between Letters. The Top Navigation Area 13-7 and the Bottom Navigation Area 13-8 are also illustrated.

Figure 15A:
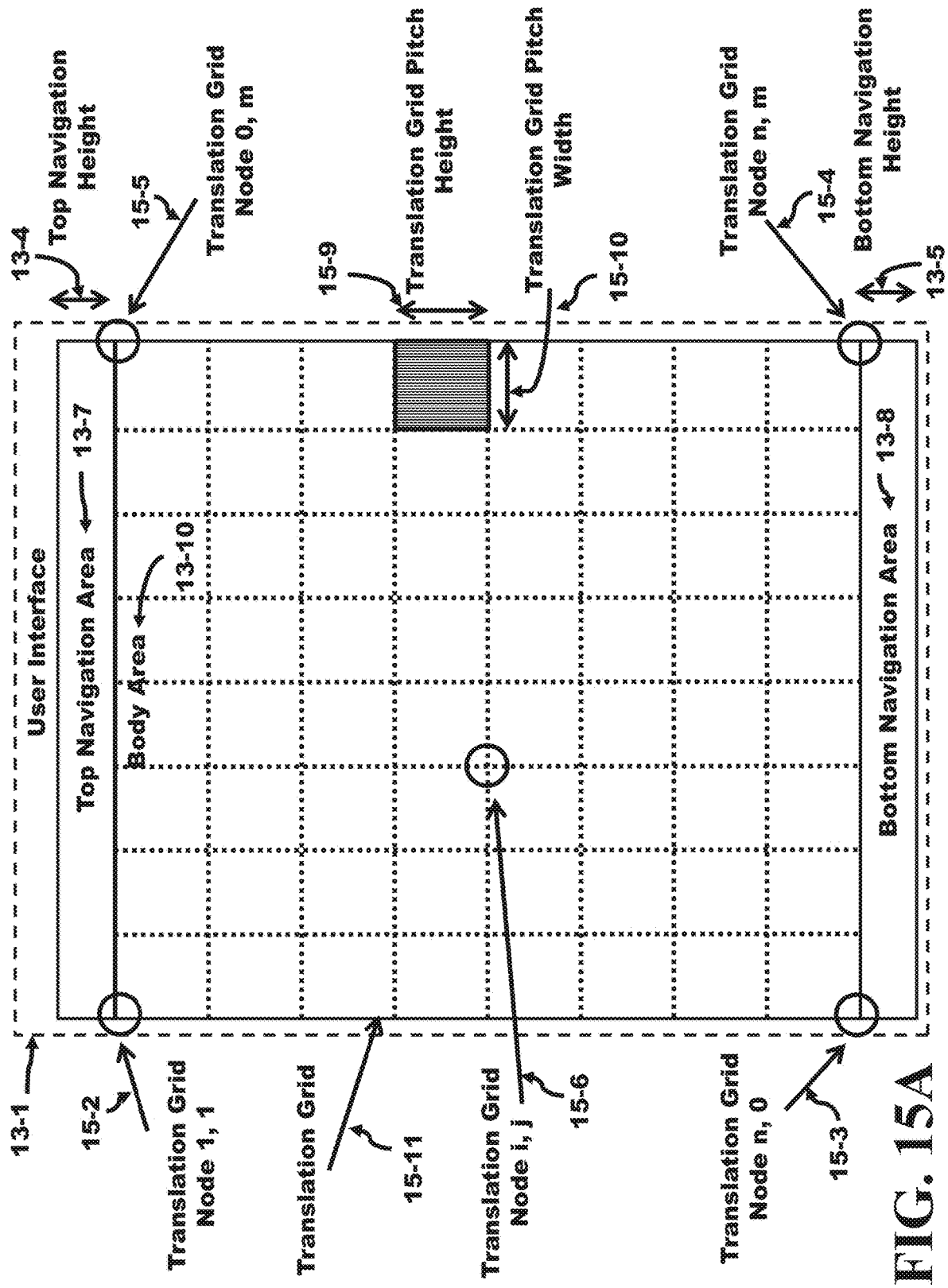
FIGS. 15A and 15B illustrates a Translation grid with Translation Grid Nodes, Height, and width in accordance with the present invention.

FIG. 15A shows the Translation Grid 15-11 applied to the Body Area 13-10 of a Page User Interface 13-1. The Translation Grid 15-11 is used by the User Interface Translator 11-2 to perform the translation of the Reference Client Device User Interface 11-1 and generate the User Interface for all Client Devices which the Application Client is desired to run on. The Translation Grid 15-11 is defined by a Translation Grid Pitch that is defined by a Translation Grid Pitch Width 15-10 and a Translation Grid Pitch Height 15-9. The Translation Grid 15-11 consists of a plurality of Translation Grid Node i, j 15-6, numbered sequentially according to their position on the X axis and Y axis of the Body Area 13-10. The Translation Grid Node 1,1 15-2 defines the top left corner of the Translation Grid 15-11 and coincides with the top left corner of the Body Area 13-10, the Translation Grid Node 0,m 15-5 defines the top right corner of the Translation Grid 15-11 and coincides with the top right corner of the Body Area 13-10, the Translation Grid Node n,0 15-3 defines the bottom left corner of the Translation Grid 15-11 and coincides with the bottom left corner of the Body Area 13-10, Translation Grid Node n,m 15-4 defines the bottom right corner of the Translation Grid 15-11 and coincides with the bottom right corner of the Body Area 13-10. There are n rows of Translation Grid Nodes along the height of the Body Area 13-10. Adjacent rows of Translation Grid Nodes are equally spaces with distance Translation Grid Pitch Height. There are m columns of Translation Grid Nodes along the width of the Body Area. Adjacent columns of Translation Grid Nodes are equally spaced with distance Translation Grid Pitch Width. The Top Navigation Area 13-7 with a Top Navigation Height 13-4 and the Bottom Navigation Area 13-8 with a Bottom Navigation Height 13-5 are also illustrated.

Figure 15B:
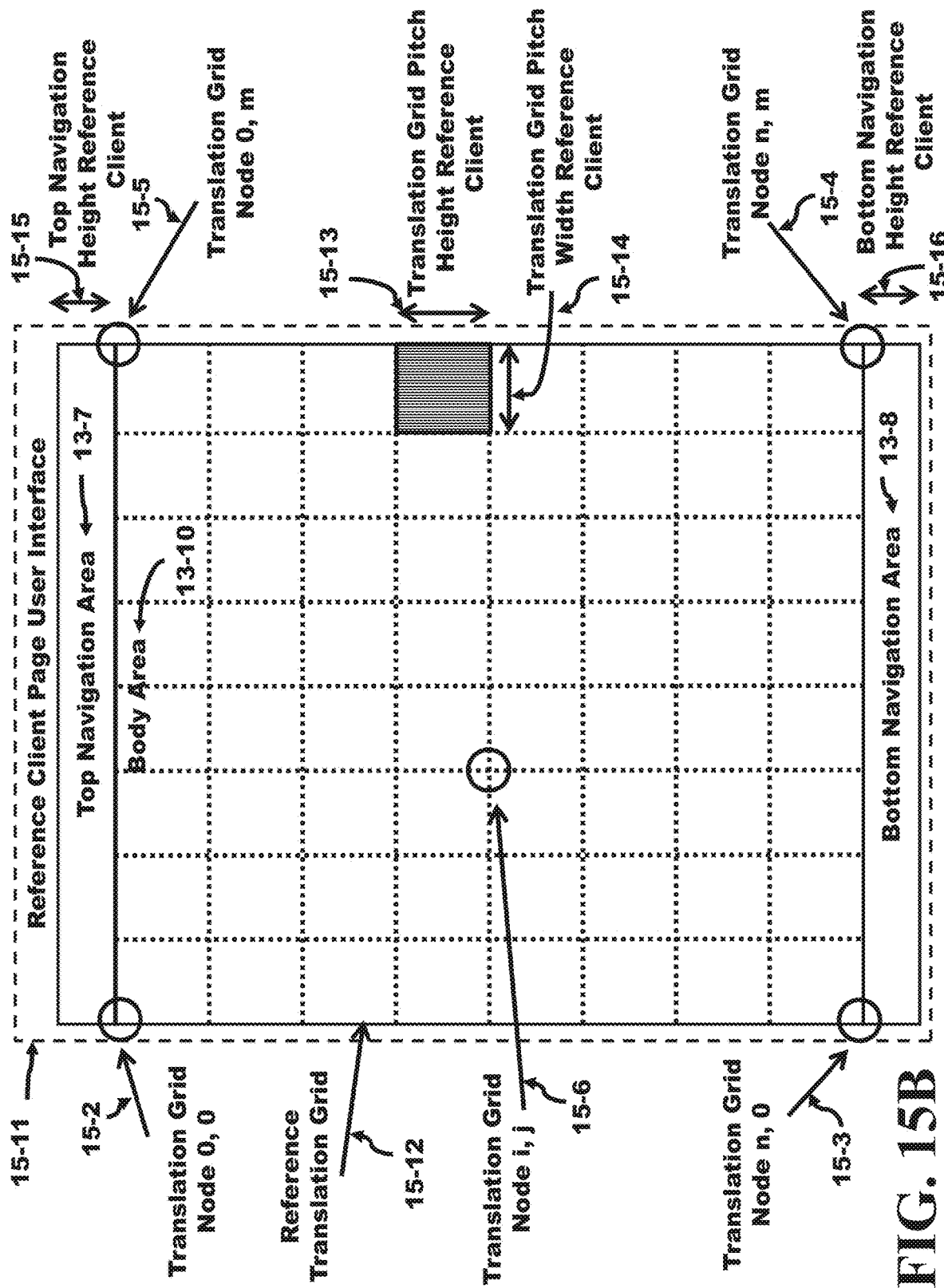

FIG. 15B shows the Reference Translation Grid 15-12, which is the Translation Grid applied to a Reference Client Page User Interface 15-1, which is comprised in the Reference Client Device User Interface 11-1. The Reference Translation Grid 15-12 is used by the User Interface Translator 11-2. The Reference Translation Grid 15-12 is defined by the Translation Grid Pitch Reference Client, which consists of the Translation Grid Pitch Height Reference Client 15-13 and the Translation Grid Pitch Width Reference Client 15-14. The Translation Grid Pitch Height Reference Client 15-13 and the Translation Grid Pitch Reference Client 15-14 are defined based on the resolution and screen size of the Reference Client Device. The finer the Translation Grid Pitch Reference Client, the larger the number of Translation Grid Nodes in the Reference Translation Grid and the more accurate the translation process performed by the User Interface Translator 11-2, but the higher the computation complexity of the User Interface Translator 11-2. The remaining identifier numerics correspond to those described in FIG. 15A.

Figure 16:
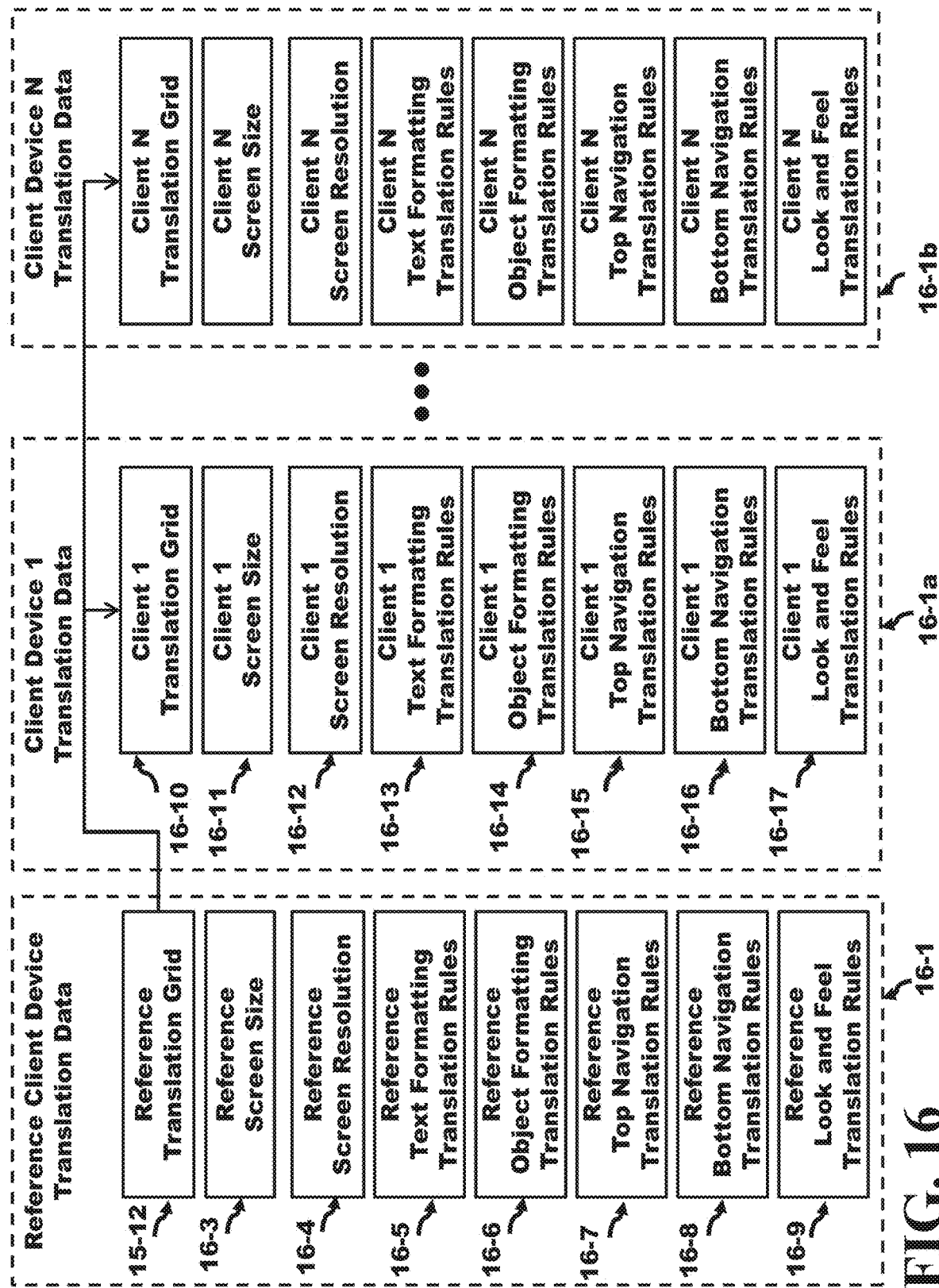
FIG. 16 depicts the process for preparing all Clients for Translation in accordance with the present invention.

FIG. 16 illustrates all the translation data that needs to be prepared in order for the User Interface Translator 11-2 to perform the translation of the Reference Client Device User Interface 11-1 and generate the User Interface for all Client Devices which the Application Client is desired to run on. The translation data illustrated in FIG. 16 needs to be prepared for the Reference Client Device and for each Client Device in the plurality of Client Devices of different types that the Application Client is desire to run on. The translation data illustrated in FIG. 16 depends only on the characteristics of each Client Device in terms of operating system, hardware, and look and feel. Thus, once the translation data is computed for a Client Device, it is used by the User Interface Translator 11-2 to translate any Reference User Interface to that Client Device.

The Reference Client Device Translation Data 16-1 includes the following. A Reference Translation Grid 15-12. A Reference Screen Size 16-3, which consists of the Screen Height, Screen Width, and aspect ratio of the screen of the Reference Client Device. If the Usable Area of screen of the Reference Client Device is smaller than the actual area of the physical screen of the Reference Client Device, an adjustment is made to reflect the area of the Usable Area. A Reference Screen Resolution 16-4, which is the resolution of the screen of the Reference Client Device. A Reference Text Formatting Rules 16-5 which includes a list of supported fonts and font sizes, a list of the dimensions of the areas occupied by letters of different fonts and font sizes, a list of spacing rules between letters and between words for different fonts and font sizes, a list of rules for font styles, and other formatting rules. A Reference Object Formatting Translation Rules 16-6, which includes a list of cropping rules, border rules, and spacing rules for pictures, videos, and shapes, a list of object effect rules that includes recommended ways to display shadows, transparencies, 3-D effects, etc., a list of outline rules that includes recommended widths and effects of outlines, and other formatting rules. A Reference Top Navigation Translation Rules 16-7 which defines the dimensions of the top navigation area, and any other rule that applies to the top navigation area, if present. A Reference Bottom Navigation Translation Rules 16-8 which defines the dimensions of the bottom navigation area, and any other rule that applies to the top navigation area, if present. A Reference Look and Feel Translation Rules 16-9 which defines the Look and Feel guidelines of the Reference Client Device.

The Client Device 1 Translation Data 16-1a contains the translation data for a first Client Device 1 with certain operating system, hardware, and look and feel characteristics that are different from the corresponding characteristics of the Reference Client Device. The Client Device 1 Translation Data 16-1a includes the following. A Client 1 Translation Grid 16-10 which is the Translation Grid applied to Client Device 1. This grid has the same number of rows of Translation Grid Nodes as the Reference Translation Grid and the same number of Translation Grid Nodes as the Reference Translation Grid. The ratio of the Translation Grid Pitch Height of the Client 1 Translation Grid 16-10 and the Reference Translation Grid 15-12 depends on the relative height, width, resolution, and pixel dimension of the screen of the Reference Client Device and of Client Device 1. A Client 1 Screen Size 1 16-11, which consists of the Screen Height, Screen Width, and aspect ratio of the screen of Client Device 1. If the Usable Area of screen of Client Device 1 is smaller than the actual area of the physical screen of the Client Device 1, an adjustment is made to reflect the area of the Usable Area. A Client 1 Screen Resolution 16-12, which is the resolution of the screen of the Client Device 1. A Client 1 Text Formatting Translation Rules 16-13 which includes a list of fonts and font sizes supported in Client Device 1, a list of the dimensions of the areas occupied by letters of different fonts and font sizes in Client Device 1, a list of spacing rules between letters and between words for different fonts and font sizes in Client Device 1, a list of rules for font styles in Client Device 1, and other formatting rules in Client Device 1. The Client 1 Text Formatting Translation Rules 16-13 also includes a list of font substitution rules for fonts that are supported in the Reference Client Device but are not supported in Client Device 1. A Client 1 Object Formatting Translation Rules 16-14 which includes a list of cropping rules, border rules, and spacing rules for pictures, videos, and shapes in Client Device 1, a list of object effect rules that includes recommended ways to display shadows, transparencies, 3-D effects, etc., in Client Device 1, a list of outline rules that includes recommended widths and effects of outlines, and other formatting rules in Client Device 1. A Client 1 Top Navigation Translation Rules 16-15 which defines the dimensions of the top navigation area in Client Device 1, and any other rule that applies to the top navigation area, if present. A Client 1 Bottom Navigation Translation Rules 16-16 which defines the dimensions of the bottom navigation area in Client Device 1, and any other rule that applies to the top navigation area, if present. A Client 1 Look and Feel Translation Rules 16-17 which defines the Look and Feel guidelines of Client Device 1. The Client 1 Look and Feel Translation Rules 16-17 must include a Look and Feel Translation Rule for Client Device 1 for each Look and Feel Translation Rule included in the Reference Look and Feel Translation Rules 16-9. Client Device Translation Data is prepared in a similar fashion for all the Client Devices in the plurality of Client Devices which the Application Client is desired to run on.

Figure 17:
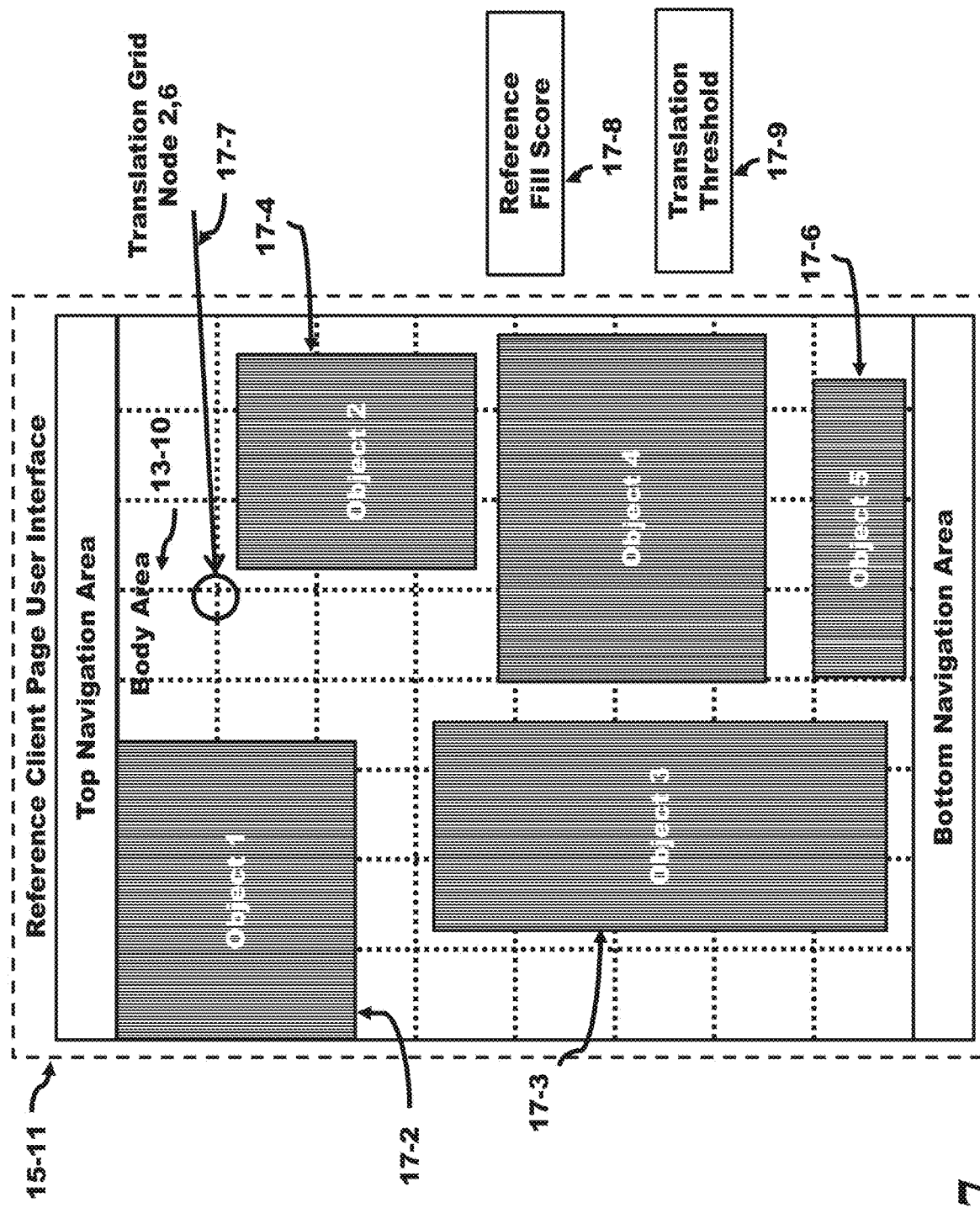
FIG. 17 shows the process of placing Objects on the Reference Translation Grid of a Reference Client Device in accordance with the present invention.

FIG. 17 illustrates at a high level the method used by the User Interface Translator 11-2 to perform the translation of each Reference Client Page User Interface 15-11 comprised in the Reference Client Device User Interface 11-1 and generate the User Interface for all Client Devices which the Application Client is desired to run on. Each Reference Client Page User Interface 15-11 comprised in the Reference Client Device User Interface 11-1 is individually translated. Each Object in the plurality of Objects is associated with the Translation Grid Node closest to the top left corner of the Object in the Reference Translation Grid 15-12. For example, Object 2 17-4 is associated with Translation Grid Node 2,6 17-7. To improve the accuracy of the translation process, the Object Origin Distance can be computed for each object along the X and Y axis. The Object Origin Distance along the X axis is the distance of the top left corner of the Object from the associated Translation Grid Node, computed along the X axis, as a percentage of the Translation Grid Pitch Width Reference Client 15-14. The Object Origin Distance along the Y axis is the distance of the top left corner of the Object from the associated Translation Grid Node, computed along the Y axis, as a percentage of the Translation Grid Pitch Height Reference Client 15-13. The Reference Fill Score 17-8 for the Reference Client Page User Interface is computed as the percentage of the Reference Translation Grid which is not covered by any Object, except for the Body Area Background. The Object 1 17-2, Object 3 17-3, Object 5 17-6 are also placed and also illustrated In order to translate the Reference Client Page User Interface 15-11 and generate a corresponding Page User Interface 13-1 for a first Client Device 1 1-2, the top left corner of each Object that is displayed in the Reference Client Page User Interface 15-11 is placed on the Client 1 Translation Grid 16-10, on the Translation Grid Node corresponding to the Translation Grid Node associated with the top left corner of the Object in the Reference Translation Grid 15-12. In order to improve accuracy, the position of the top left corner of the Object in the Client 1 Translation Grid 16-10 can be adjusted using the Object Origin Distance, using the same percentages computed in the Reference Translation Grid 15-12. Then, the size of the Object is scaled proportionally based on the ratio of the Reference Screen Size 16-3 and Client 1 Screen Size 16-11. The Objects are then adjusted using Client 1 Object Formatting Translation Rules 16-14, Client 1 Text Formatting Translation Rules 16-13 and Client 1 Look and Feel Translation Rules 16-17.

Figure 18:
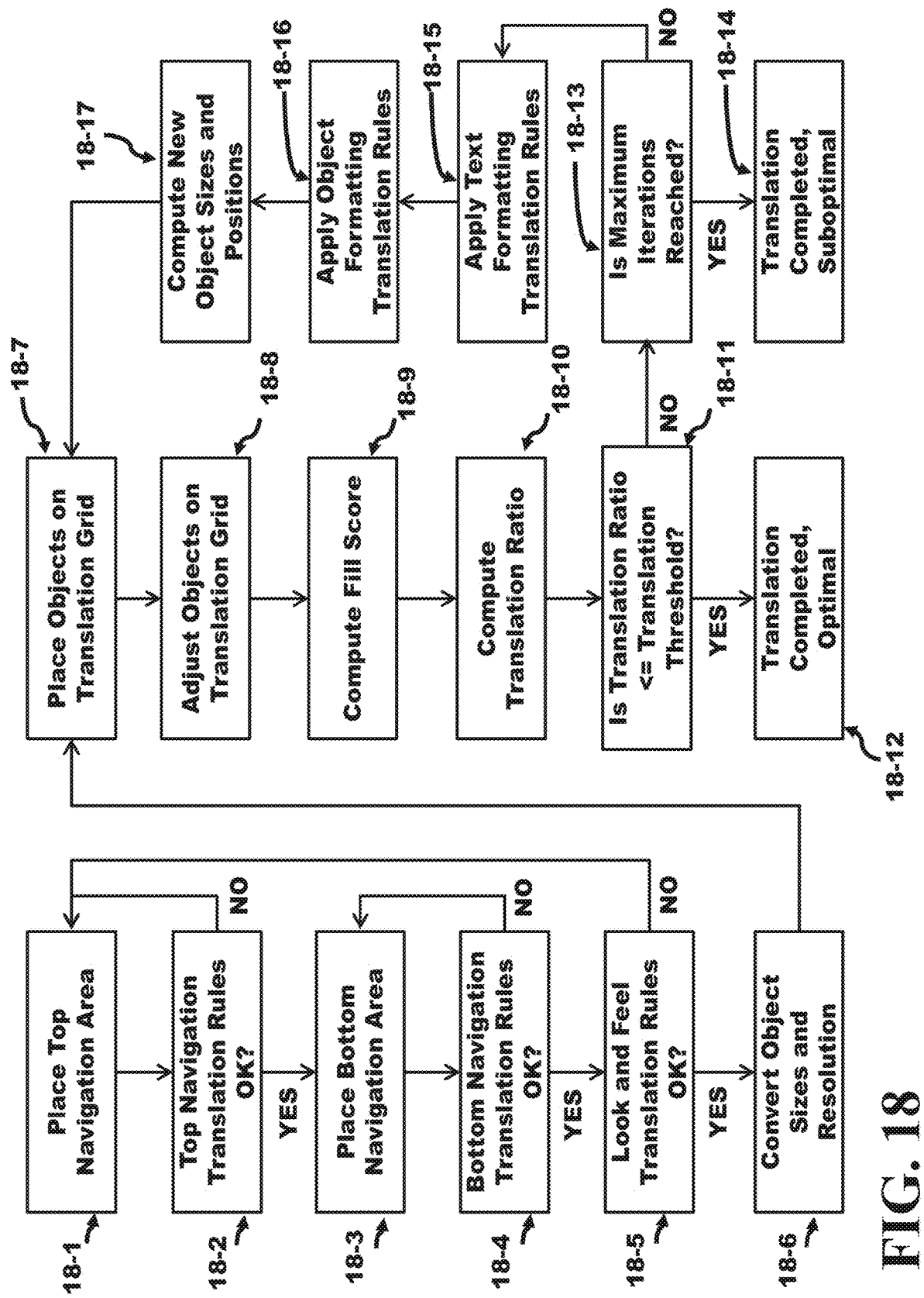
FIG. 18 depicts a flow chart of an algorithm to determine optimal and sub-optimal Translation in accordance with the present invention.

FIG. 18 shows the details of the process used by the User Interface Translator 11-2 to perform the translation of each Reference Client Page User Interface 15-11 comprised in the Reference Client Device User Interface 11-1 and generate the corresponding Page User Interface 13-1 for a first Client Device 1 1-2 in the plurality of Client Devices which the Application Client is desired to run on. First, "Place Top Navigation Area" 18-1 generates the Top Navigation Area 13-7 (if present) for the corresponding Page User Interface 13-1 for Client Device 1 1-2. If the result of "Top Navigation Translation Rules OK?" 18-2 is "YES", the "Place Bottom Navigation Area" 18-3 is executed, otherwise adjustments are made to the generated Top Navigation Area 13-7 until the Client 1 Top Navigation Translation Rules 16-15 are satisfied.

"Place Bottom Navigation Area" 18-3 generates the Bottom Navigation Area 13-8 (if present) for the corresponding Page User Interface 13-1 for Client Device 1 1-2. If the result of "Bottom Navigation Translation Rules OK?" 18-4 is "YES", the "Look and Feel Translation Rules OK?" 18-5 is executed, otherwise adjustments are made to the generated Bottom Navigation Area 13-8 until the Client 1 Bottom Navigation Translation Rules 16-16 are satisfied. The Top Navigation Area 13-7 and Bottom Navigation Area 13-8 must be generated separately from the Body Area 13-10 because they are governed by the Top Navigation Translation Rules 16-15 and Bottom Navigation Translation Rules 16-16, rather than the placement of the Objects on the Client 1 Translation Grid 16-10, which applies to the Body Area 13-10. The "Look and Feel Translation Rules OK?"18-5 checks that the Client 1 Look and Feel Translation Rules 16-17 are satisfied. If they are, the process moves to the "Convert Object Sizes and Resolution" 18-6, otherwise adjustments are made until the Client 1 Look and Feel Translation Rules 16-17 are satisfied. The "Convert Object Sizes and Resolution" 18-6 scales the size of the Object proportionally based on the ratio of the Reference Screen Size 16-3 and Client 1 Screen Size 16-11. The "Place Objects on Translation Grid" 18-7 places the Objects on the Client 1 Translation Grid 16-10. For each Object, the top left corner is placed on the Client 1 Translation Grid 16-10, on the Translation Grid Node corresponding to the Translation Grid Node associated with the top left corner of the Object in the Reference Translation Grid 15-12. In order to improve accuracy, the position of the top left corner of the Object in the Client 1 Translation Grid 16-10 can be adjusted using the Object Origin Distance, using the same percentages computed in the Reference Translation Grid 15-12. The "Adjust Objects on Translation Grid" 18-8 then adjusts the Objects by tweaking their sizes to minimize distortion. The Objects are then adjusted using Client 1 Object Formatting Translation Rules 16-14, Client 1 Text Formatting Translation Rules 16-13 and Client 1 Look and Feel Translation Rules 16-17.

The "Compute Fill Score" 18-9 computes the Client 1 Fill Score as the percentage of the Client Translation Grid which is not covered by any Object, except for the Body Area Background. The "Compute Translation Ratio" 18-10 computes the Translation Ratio for the Page User Interface 13-1 as the ratio between the Client 1 Fill Score and the Reference Fill Score 17-8. The computed Translation Ratio for the Page User Interface 13-1 is compared with a pre-configured Translation Threshold 17-9 in "Is Translation Ratio<=Translation Threshold?" 18-11. If the computed Translation Ratio for the Page User Interface 13-1 is smaller or equal than the Translation Threshold 17-9, the "Translation Completed, Optimal" is reached. The Translation Threshold is configured empirically. A Translation Ratio equal to 1 is an indication of a "perfect translation," since the Objects in the Client 1 Page User Interface maintain the same relative sizes and positions of the Objects in the corresponding Reference Client Page User Interface 15-11. However, because of the wide variations in the characteristics of different Client Devices, a "perfect translation" is not always possible. The Translation Threshold is typically configured to a value above 1, to allow for some tolerance in the translation process.

If the computed Translation Ratio is larger than the Translation Threshold 17-9, a Current Iteration Parameter is incremented and the "Is Maximum Iterations Reached?" 18-13 is executed. If the value of the Current Iteration Parameter is lower than the value of a pre-configured Maximum Iteration Parameter, adjustments are made in the Objects and in their placement in an attempt to improve the translation result. Adjustments are introduced by executing "Apply Text Formatting Translation Rules" 18-15, "Apply Object Formatting Translation Rules" 18-16 and "Compute New Object Sizes and Positions" 18-17, and then repeating "Place Objects on Translation Grid" 18-7 and the rest of the process. Examples of adjustments that can be made include the following. Tweaks in the size and position of the Objects, according to the Client 1 Object Formatting Translation Rules 16-14 and the relationships between Objects, such relationships including maintain alignment and relative sizes of Objects. Changes in the Fonts, Font Sizes, Spacing between Words, Spacing between Letters, etc., according to the Client 1 Text Formatting Translation Rules.

Once the value of the Current Iteration Parameter reaches the value of the Maximum Iteration Parameter, the process is terminated and the "Translation Completed, Suboptimal" 18-14 is reached. The "Translation Completed, Suboptimal" 18-14 indicates that the translated Page User Interface may provide a user experience that is in some respect different than the user experience provided by the corresponding Reference Client Page User Interface 15-11. If the "Translation Completed, Suboptimal" 18-14 is reached for a certain Page User Interface 13-1 for a first Client Device 1 1-2, the Business Entity may decide to have a User Interface designer skilled in the art adjust the Objects on the Page User Interface manually.

The process described in FIG. 18 is repeated for all Reference Client Page User Interfaces 15-11 comprised in the Reference Client Device User Interface 11-1.

Finally, it is understood that the above descriptions are only illustrative of the principle of the current invention. Various alterations, improvements, and modifications will occur and are intended to be suggested hereby, and are within the spirit and scope of the invention. This invention can, however, be embodied in many different forms and should not be construed as limited to the embodiments set forth herein. Rather, these embodiments are provided so that the disclosure will be thorough and complete, and will fully convey the scope of the invention to those skilled in the arts. It is understood that the various embodiments of the invention, although different, are not mutually exclusive. In accordance with these principles, those skilled in the art can devise numerous modifications without departing from the spirit and scope of the invention. For example, In addition, a network and a portable system can exchange information wirelessly by using communication techniques such as Time Division Multiple Access (TDMA), Frequency Division Multiple Access (FDMA), Code Division Multiple Access (CDMA), Orthogonal Frequency Division Multiplexing (OFDM), Ultra Wide Band (UWB), Wi-Fi, WiGig, Bluetooth, etc. The network can comprise the phone network, IP (Internet protocol) network, Local Area Network (LAN), ad hoc networks, local routers and even other portable systems. In addition, the term "Mobile Client Device" can be used for mobile devices such as cellphone, tablets, etc. "Non-Mobile Client Device" can be used for non-mobile devices such as desktops. "Cloud Client Device" can be used for the device formed in the Cloud. At other instants the term "Client Device" can imply either the "Mobile Client Device," "Non-Mobile Client Device" or "Cloud Client Device."

What is claimed is:

1. A method comprising:
   superimposing a reference translation grid on a reference mobile device user interface, the reference mobile device user interface comprising one or more objects;
   computing a reference fill score based on a covered portion of the reference translation grid occupied by the one or more objects;
   selecting a client mobile device with a client mobile device user interface;
   superimposing a client translation grid on the client mobile device user interface;
   placing the one or more objects on the client translation grid;
   computing a client fill score based on the covered portion of the client translation grid occupied by the one or more objects on the client translation grid;
   computing a translation ratio as the ratio of the client fill score and the reference fill score; and
   comparing the computed translation ratio to a translation threshold.

2. The method of claim 1, wherein the client fill score is a percentage of the client translation grid that is not covered by any of the one or more objects.

3. The method of claim 1, wherein the reference fill score is a percentage of the reference translation grid that is not covered by any of the one or more objects.

4. The method of claim 1, wherein if the computed translation ratio is greater than the translation threshold an adjustment is made to the one or more objects in the client translation grid.

5. The method of claim 4, wherein the adjustment comprises a change in size and a placement in the client translation grid.

6. The method of claim 1, wherein the reference translation grid and the client translation grid each comprise one or more rows and one or more columns.

7. The method of claim 6, wherein the reference translation grid contains a same number of rows and columns as the client translation grid.

8. The method of claim 1, wherein the reference mobile device comprises a first operating system and the selected client mobile device comprises a second operating system.

9. The method of claim 1, wherein the reference mobile device comprises a screen with a first resolution and the selected client mobile device comprises a screen with a second resolution.

10. A system comprising:
    a reference mobile device comprising a display configured to display a reference user interface that comprises one or more objects and a superimposed reference translation grid;
    a user interface translator configured to compute a reference fill score based on a covered portion of the superimposed reference translation grid occupied by the one or more objects;
    a client mobile device comprising a display configured to display a client user interface that comprises the one or more objects and a superimposed client translation grid; and
    the user interface translator further configured to compute a client fill score based on a covered portion of the superimposed client translation grid occupied by the one or more objects, and to compute a translation ratio as a ratio of the client fill score and the reference fill score, wherein the computed translation ratio is compared to a translation threshold.

11. The system of claim 10, wherein the user interface translator is configured to compute the client fill score as a percentage of the superimposed client translation grid that is not covered by any of the one or more objects.

12. The system of claim 10, wherein the user interface translator is configured to computer the reference fill score as a percentage of the superimposed reference translation grid that is not covered by any of the one or more objects.

13. The system of claim 10, wherein the user interface translator is configured to determine if the computed translation ratio is greater than the translation threshold, wherein an adjustment is made to the one or more objects in the superimposed client translation grid.

14. The system of claim 13, wherein the user interface translator is configured to make the adjustment comprising a change in size and a placement in the superimposed client translation grid.

15. The system of claim 10, wherein the user interface translator is configured to generate the superimposed reference translation grid and the superimposed client translation grid where each comprises one or more rows and one or more columns.

16. The system of claim 15, wherein the user interface translator is configured to generate the superimposed reference translation grid that contains a same number of rows and columns as the superimposed client translation grid.

17. The system of claim 10, wherein the user interface translator is cloud based.

18. The system of claim 10, wherein the reference mobile device comprises a first operating system and the client mobile device comprises a second operating system.

19. The system of claim 10, wherein the reference mobile device comprises a screen with a first resolution and the client mobile device comprises a screen with a second resolution.

20. The system of claim 10, wherein the reference mobile device comprises a screen with a first aspect ratio and the client mobile device comprises a screen with a second aspect ratio.

* * * * *